US012731727B2

(12) United States Patent
Riehl et al.

(10) Patent No.: US 12,731,727 B2
(45) Date of Patent: Sep. 8, 2026

(54) CURRENT TRANSFORMER ASSEMBLIES

(71) Applicant: Schneider Electric USA, Inc., Andover, MA (US)

(72) Inventors: Kenneth Riehl, Cedar Rapids, IA (US); Juan Ignacio Melecio, North Liberty, IA (US); Jeremy D. Schroeder, Cedar Rapids, IA (US)

(73) Assignee: Schneider Electric USA, Inc., Boston, MA (US)

( * ) Notice: Subject to any disclaimer, the term of this patent is extended or adjusted under 35 U.S.C. 154(b) by 457 days.

(21) Appl. No.: 18/125,116

(22) Filed: Mar. 22, 2023

(65) Prior Publication Data

US 2024/0222003 A1 Jul. 4, 2024

Related U.S. Application Data

(60) Provisional application No. 63/436,446, filed on Dec. 30, 2022.

(51) Int. Cl.

| | |
|---|---|
| ***H01F 27/42*** | (2006.01) |
| ***H01F 27/02*** | (2006.01) |
| ***H01F 27/36*** | (2006.01) |
| ***H01F 30/16*** | (2006.01) |

(52) U.S. Cl.

CPC ......... *H01F 27/427* (2013.01); *H01F 27/027* (2013.01); *H01F 27/366* (2020.08); *H01F 30/16* (2013.01)

(58) Field of Classification Search

CPC .... H01F 27/427; H01F 27/027; H01F 27/366; H01F 30/16; H01F 2038/305; H01F 38/30

See application file for complete search history.

(56) References Cited

U.S. PATENT DOCUMENTS

| | | | | |
|---|---|---|---|---|
| 5,488,303 | A | 1/1996 | Bagalini | |
| 6,433,977 | B1 | 8/2002 | Macbeth | |
| 6,876,528 | B2 | 4/2005 | Macbeth | |
| 7,684,162 | B2 | 3/2010 | Musat et al. | |
| 2008/0106253 | A1 | 5/2008 | Kojovic | |
| 2011/0006802 | A1 * | 1/2011 | Younsi ................. | G01R 15/185 336/173 |
| 2011/0116197 | A1 * | 5/2011 | Zylstra ................. | G01R 15/183 336/174 |
| 2014/0009253 | A1 * | 1/2014 | Dell ........................ | H01F 38/30 336/174 |

(Continued)

OTHER PUBLICATIONS

International Search Report and Written Opinion for corresponding International Patent Application No. PCT/US23/085479 dated May 22, 2024, 18 pages.

*Primary Examiner* — Lee E Rodak
*Assistant Examiner* — Zannatul Ferdous
(74) *Attorney, Agent, or Firm* — Patterson + Sheridan, LLP

(57) ABSTRACT

A current transformer for a ground fault circuit interrupter (GFCI) can include a core having a closed loop shape having a first side, a second side, and a core opening, and a sense coil wrapped around the core configured to magnetically couple to a plurality of conductors passing through the core opening. The current transformer can include a first magnetic shield disposed on the first side of the core over the sense coil, and a second magnetic shield disposed on a second side of the core over the sense coil.

16 Claims, 25 Drawing Sheets

SECTION A-A

(56) References Cited

U.S. PATENT DOCUMENTS

| | | | | |
|---|---|---|---|---|
| 2014/0176271 | A1* | 6/2014 | Oughton, Jr. | H01F 27/38 336/60 |
| 2015/0333498 | A1* | 11/2015 | Weeks | H01H 83/04 324/509 |
| 2018/0366265 | A1* | 12/2018 | Jang | H01F 27/25 |
| 2019/0214155 | A1 | 7/2019 | Thompson et al. | |
| 2019/0285668 | A1 | 9/2019 | Jansen et al. | |
| 2020/0035435 | A1 | 1/2020 | Kamor et al. | |

* cited by examiner

SECTION A-A

SECTION A–A

300

CURRENT TRANSFORMER ASSEMBLIES

CROSS-REFERENCE TO RELATED APPLICATIONS

This application claims priority to and the benefit of U.S. Provisional Application No. 63/436,446, filed Dec. 30, 2022, the entire contents of which are herein incorporated by reference in their entirety.

FIELD

This disclosure relates to current transformers.

BACKGROUND

Traditional current transformers (CT) for determining ground faults can have uneven coils and experience asymmetric magnetic coupling to the relative location of the two or more conductors passing through the CT. This asymmetry can result in false indications as to whether there is a ground fault, for example, because a current is induced in the CT even though the current on the two lines can be substantially the same and should theoretically cancel out. Thus, an induced current on the CT sense coil can falsely indicate that there is a ground fault, even when there is not actually a current mismatch between conductors.

Such conventional methods and systems have generally been considered satisfactory for their intended purpose. However, there is still a need in the art for improvements. The present disclosure provides a solution for this need.

SUMMARY

A current transformer for a ground fault circuit interrupter (GFCI) can include a core having a loop shape having a first side, a second side, and a core opening, and a sense coil wrapped around the core configured to magnetically couple to a plurality of conductors passing through the core opening. The current transformer can include a first magnetic shield disposed on the first side of the core over the sense coil, and a second magnetic shield disposed on a second side of the core over the sense coil.

In certain embodiments, the loop shape can be a toroid shape. For example, the first magnetic shield and the second magnetic shield are washer shaped or complimentary shaped to the core.

The first magnetic shield and the second magnetic shield can be made of ferromagnetic material (e.g., a metal and/or alloy). The current transformer can include a housing configured to hold and/or enclose the first magnetic shield and the second magnetic shield with the core and sense coil.

In certain embodiments, the current transformer can include a third magnetic shield having a conduit shape disposed in the core opening. The housing can include an inner wall that extends into the core opening. The inner wall can be disposed between the sense coil and the third magnetic shield.

The conduit shape of the third magnetic shield can have an eyelet shape comprising a flange portion and a neck portion. The neck portion can be inserted into the core opening. The flange can act as an axial stop.

The housing can be made of an electrically insulating material (e.g., plastic). The housing can include an outer wall, wherein the inner wall can outer wall define a core aperture having a complimentary shape to the core and configured to receive the core therein. The first magnetic shield can be disposed within the core aperture, for example. For example, the first magnetic shield can be disposed on the sense coil and/or bonded (e.g., non-electrically adhered) to the sense coil (e.g., and the core).

The housing can define a shield aperture separated from the core aperture by a dividing wall extending between the outer wall and the inner wall of the housing. The second magnetic shield can be disposed in the shield aperture and separated from the sense coil and the core by the dividing wall.

In certain embodiments, the housing can be a single piece of material. In certain embodiments, the housing can include a first portion and a second portion configured to assemble together to contain the core, the sense coil, and at least one of the first magnetic shield and the second magnetic shield.

In certain embodiments, the first magnetic shield and the second magnetic shield can have different dimensions. For example, the first magnetic shield and the second magnetic shield can have different inner diameters.

In certain embodiments, the housing can define a plurality of terminal connections including a first sense terminal and a second sense terminal operatively connected to opposite ends of the sense coil. In certain embodiments, the current transformer can include a test coil wrapped around a portion of the core with the sense coil. The plurality of terminals can include a first test terminal and a second test terminal operatively connected to opposite ends of the test coil. In certain embodiments, the plurality of terminals can be aligned in an axial direction.

In accordance with at least one aspect of this disclosure, a GFCI can include a line conductor, a neutral conductor, and a current transformer. The current transformer can be any suitable current transformer, e.g., as disclosed above. The line conductor and the neutral conductor can pass through the core opening, for example. Any suitable number of conductors are contemplated herein.

In accordance with at least one aspect of this disclosure, a GFCI can include a line conductor, a neutral conductor, and a current transformer, e.g., as disclosed above. The current transformer can include a sense coil wrapped around the core configured to magnetically couple to the line conductor and the neutral conductor passing through the core opening, and a test coil wrapped around the core and configured to magnetically couple to the sense coil through the core to provide a test signal to the sense coil. The current transformer can include a first, second, and/or third shield as disclosed above, for example.

These and other features of the embodiments of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1A:
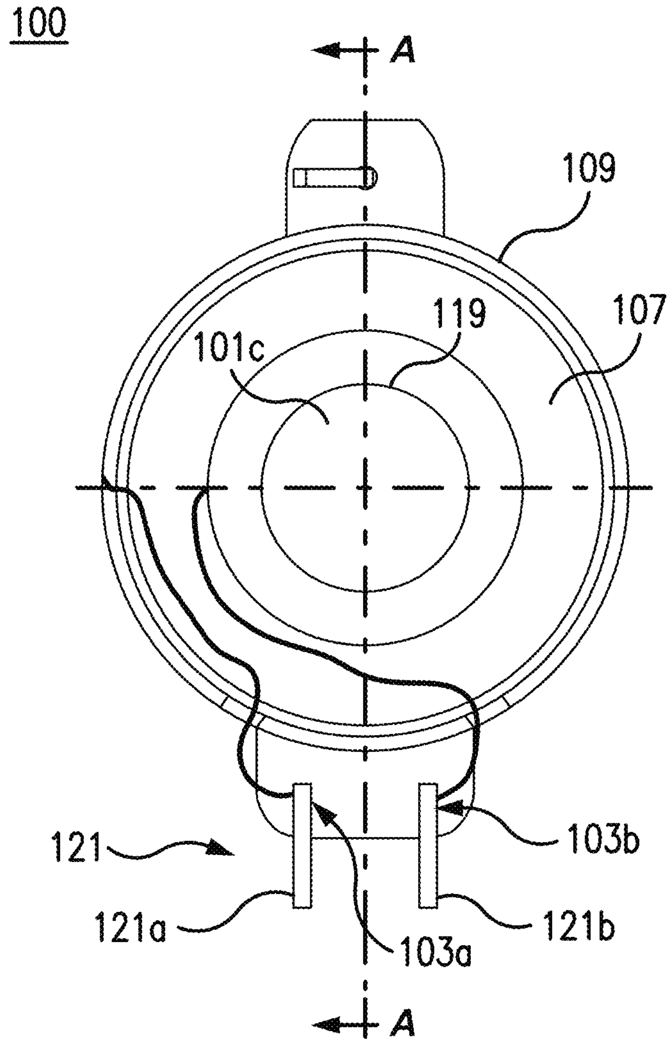
FIG. 1A is a front elevation view of an embodiment of a current transformer in accordance with this disclosure.
Figure 1B:
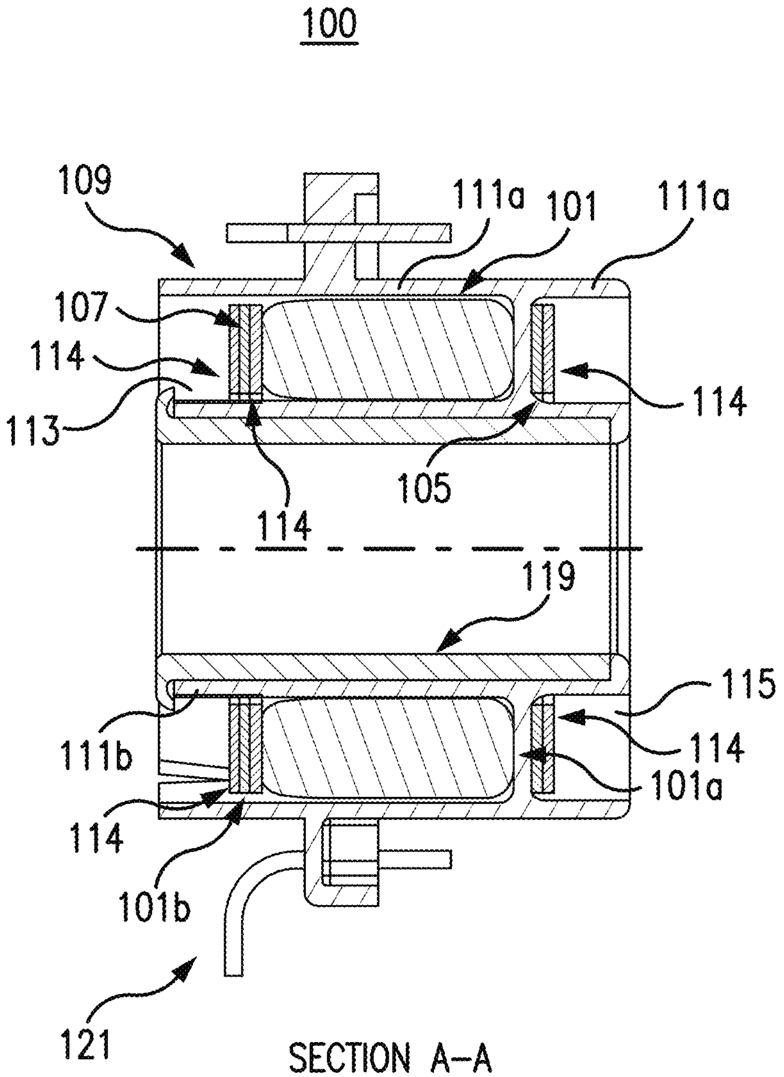
FIG. 1B is a cross-sectional view of the embodiment of FIG. 1A.
Figure 1C:
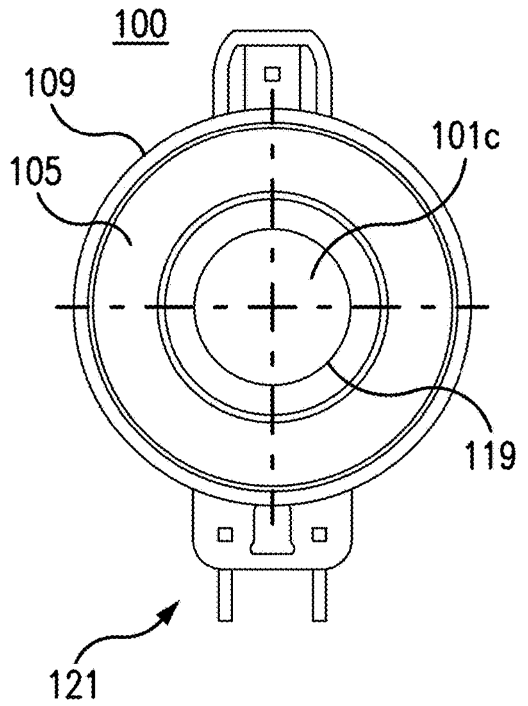
FIG. 1C is a rear elevation view of the embodiment of FIG. 1A.
Figure 1D:
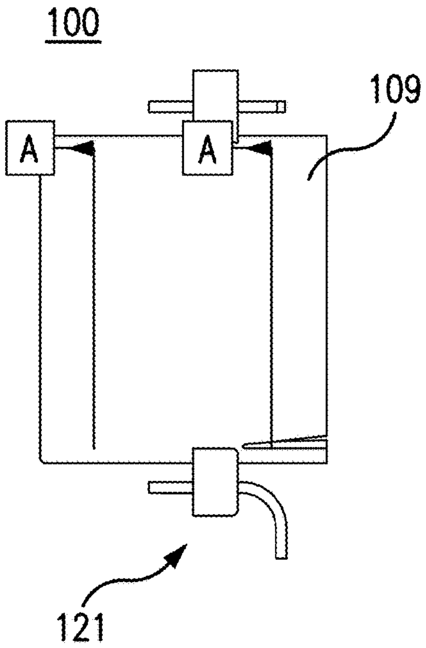
FIG. 1D is a side elevation view of the embodiment of FIG. 1A.
Figure 1E:
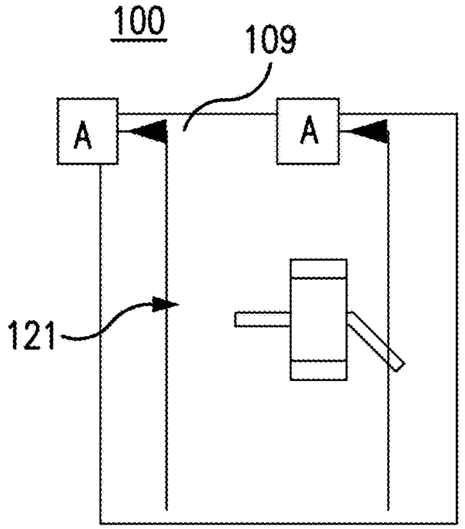
FIG. 1E is a bottom elevation view of the embodiment of FIG. 1A.

Reference will now be made to the drawings wherein like reference numerals identify similar structural features or aspects of the subject disclosure. For purposes of explanation and illustration, and not limitation, an illustrative view of embodiments of a current transformer in accordance with the disclosure is shown in FIG. 1A and FIG. 2A and is designated generally by reference character 100 and 200, respectively. Other embodiments and/or aspects of this disclosure are shown in FIGS. 1B-1F, and 2B-13.

Figure 1F:
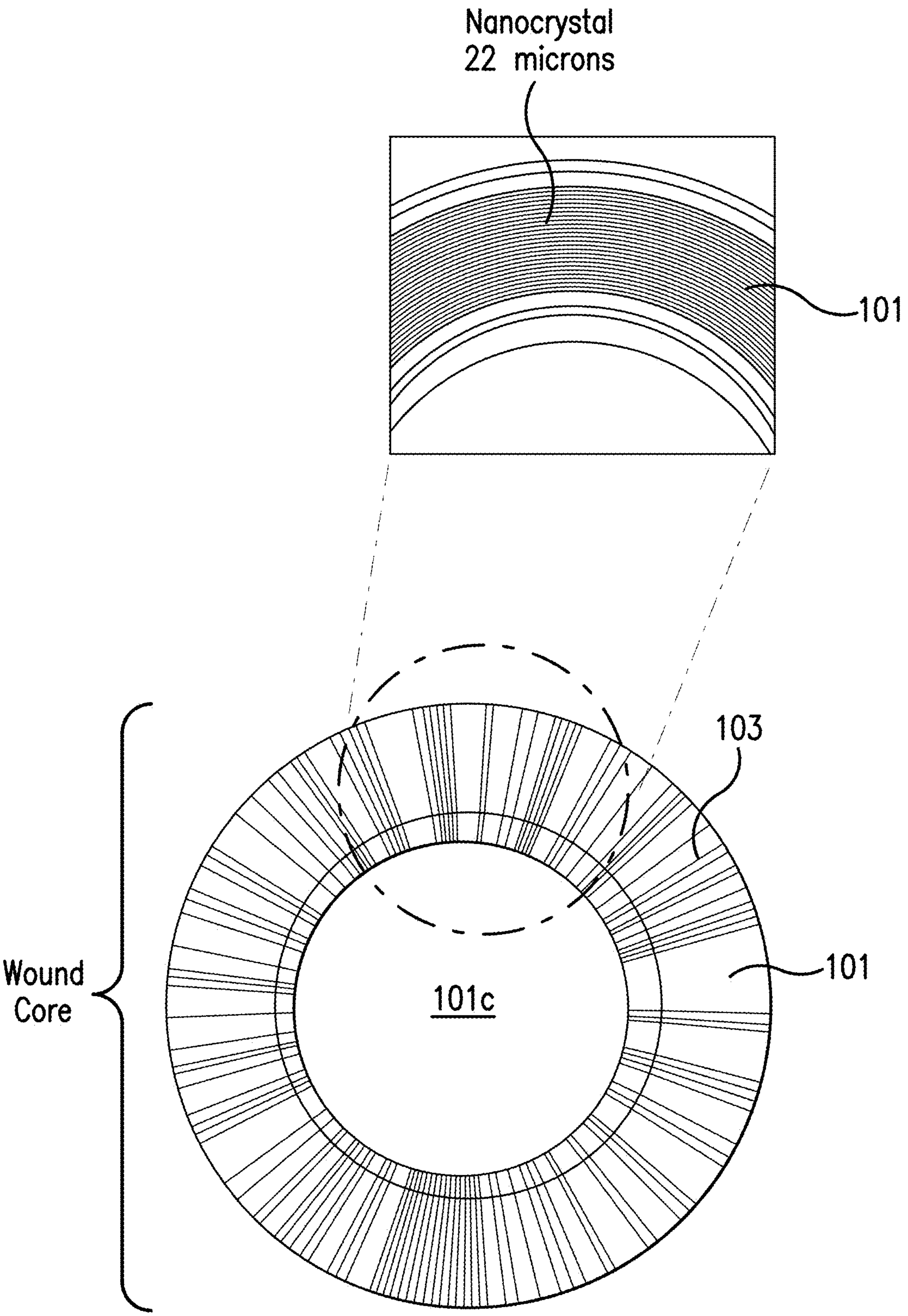
FIG. 1F is a plan view of an embodiment of a wound core of the embodiment of FIG. 1A in accordance with this disclosure.
Figure 2A:
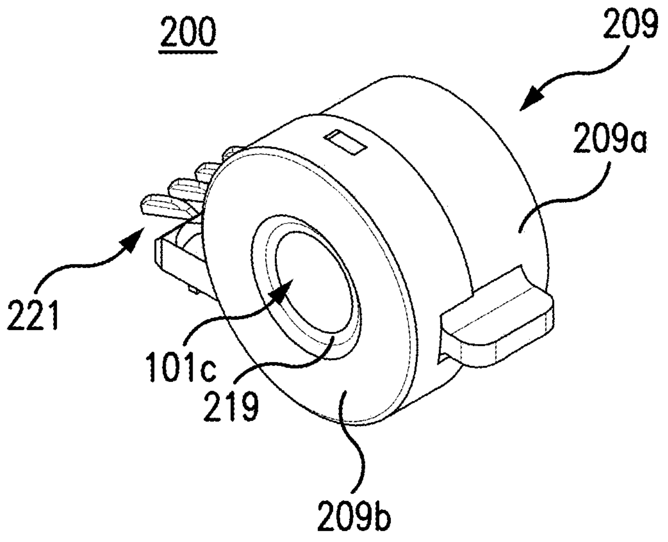
FIG. 2A is a perspective view of another embodiment of a current transformer in accordance with this disclosure.
Figure 2B:
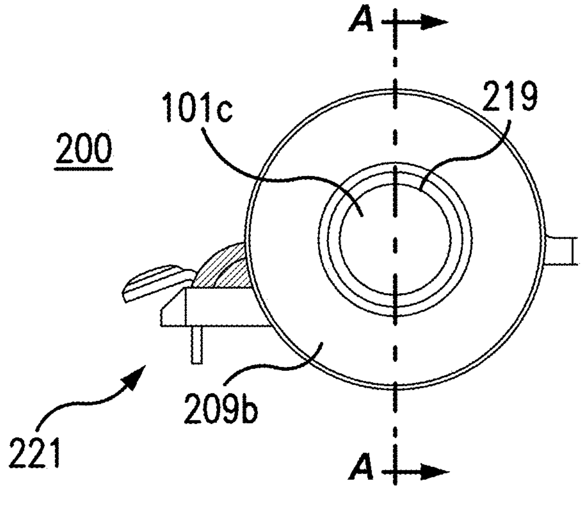
FIG. 2B is a front elevation view of the embodiment of FIG. 2A.

Referring to FIGS. 1A-2O, a current transformer 100, 200 for a ground fault circuit interrupter (GFCI) (e.g., as shown in FIGS. 3A-3D) can include a core 101 (e.g., as shown in FIG. 1F) having a loop shape (e.g., a closed loop shape, a segmented loop shape, a circular hoop shape, a toroid, a square hoop shape) having a first side 101*a*, a second side 101*b*, and a core opening 101*c*. The current transformer 100, 200 can include a sense coil 103 wrapped around the core 101 configured to magnetically couple to a plurality of conductors (e.g., at least a line wire and a neutral wire) passing through the core opening 101*c*.

The current transformer 100, 200 can include a first magnetic shield 105, 205 disposed on the first side 101*a* of the core 101 over the sense coil 103 (e.g., not in electrical communication with the sense coil 103 or the core 101). The current transformer 100, 200 can include a second magnetic shield 107, 207 disposed on a second side 101*b* of the core 101 over the sense coil 103 (e.g., not in electrical communication with the sense coil 103 or the core 101). The core 101 can be made of any suitable current transformer core material (e.g., a nanocrystalline material).

In certain embodiments, the loop shape can be a toroid shape, for example. The loop shape can be any suitable shape that induces a magnetic loop. For example, the first magnetic shield 105, 205 and the second magnetic shield 107, 207 can be washer shaped (e.g., circular with flat sides) or otherwise complimentary shaped to the core 101. In certain embodiments, the first magnetic shield 105, 205 and the second magnetic shield 107, 207 can be ellipsoid shaped, and/or any other shape conformal to the core shape.

The first magnetic shield 105, 205 and the second magnetic shield 107, 207 can be made of ferromagnetic material (e.g., a metal and/or alloy). Any other suitable magnetic shield material is contemplated herein.

The current transformer 100 can include a housing 109, 209 configured to hold and/or enclose the first magnetic shield 105, 205 and the second magnetic shield 107, 207 with the core 101 and sense coil 103.

The housing 109, 209 can be made of an electrically insulating material (e.g., plastic). The housing 109, 209 can include an outer wall 111*a*, 211*a* and an inner wall 111*b*, 211*b* defining a core aperture 113, 213 having a complimentary shape to the core 101 (e.g., including the sense coil 103 wrapped therearound) and configured to receive the core 101 therein (e.g., with the sense coil 103 wrapped around the core 101). For example, the inner wall 111*b*, 211*b* can form a tube shape over which the wound core 101, 103 can be inserted. The inner wall 111*b*, 211*b* can extend into the core opening 101*c*.

The first magnetic shield 105, 205 can be disposed within the core aperture 113, 213, for example. For example, the first magnetic shield 105, 205 can be disposed on the sense coil 103 and/or bonded to the sense coil 103 (e.g., and the core 101). In certain embodiments, the first magnetic shield 105, 205 and the second magnetic shield 107, 207 can be bonded within the housing 109, 209 using material 114 (e.g., adhesive, thermoplastic, etc.) as shown in FIG. 1B. The material 114 can be non-conductive and provide an electrical barrier in certain embodiments. Any other suitable method to hold the magnetic shields 105, 205, 107, 207 within the housing 109, 209 (e.g., and/or against the wound core 101, 103) are contemplated herein.

The housing 109, 209 can define a shield aperture 115, 215 separated from the core aperture 113, 213 by a dividing wall 117, 217 extending between the outer wall 111*a*, 211*a* and the inner wall 111*b*, 211*b* of the housing 109, 209. The second magnetic shield 107, 207 can be disposed in the shield aperture 115, 215 and separated from the sense coil 103 and the core 101 by the dividing wall 117, 217. In certain embodiments, the housing 109 can be a single piece of material, e.g., as shown in the embodiment of FIG. 1A). In certain embodiments, the second magnetic shield 107, 207 can be inserted into the core aperture 113 first, an insulating washer can be added after, and then the core 101 can be inserted. Any other suitable arrangement where the shields are insulated from the core 101 and retained is contemplated herein.

In certain embodiments, e.g., as shown in the embodiment of FIG. 2A) the housing 209 can include a first portion 209*a* and a second portion 209*b* configured to assemble together to contain the core 101, the sense coil 103, and at least one of the first magnetic shield 205 and the second magnetic shield 207 (e.g., enclosing the first magnetic shield 205 as shown in the embodiment of FIG. 2A). For example, the first portion 209*a* can be a main body portion and the second portion 209*b* can be a cap that clips onto the main body portion (e.g., via a clip 218*a* and opening 218*b*) to enclose the wound core 101, 103 and the first magnetic shield 205. In certain embodiments, the first portion 209*a* can form the outer wall 211*a*, the inner wall 211*b*, the core aperture 213, and the shield aperture 215.

Figure 2C:
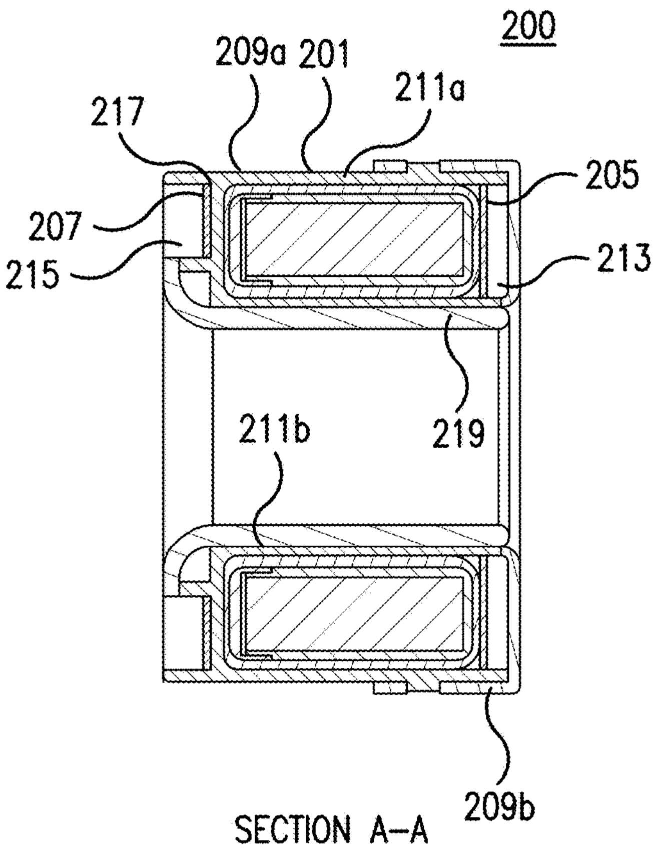
FIG. 2C is a cross-sectional view of the embodiment of FIG. 2A.
Figure 2D:
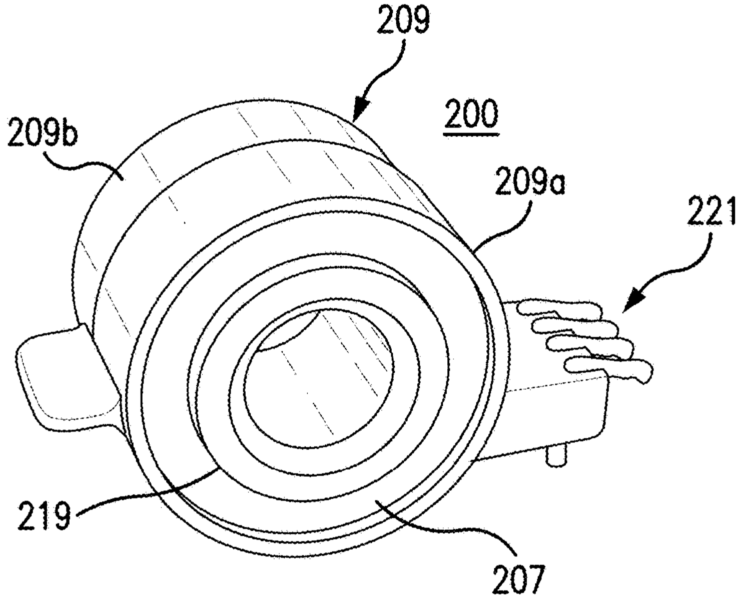
FIG. 2D is a rear perspective view of the embodiment of FIG. 2A.
Figure 2E:
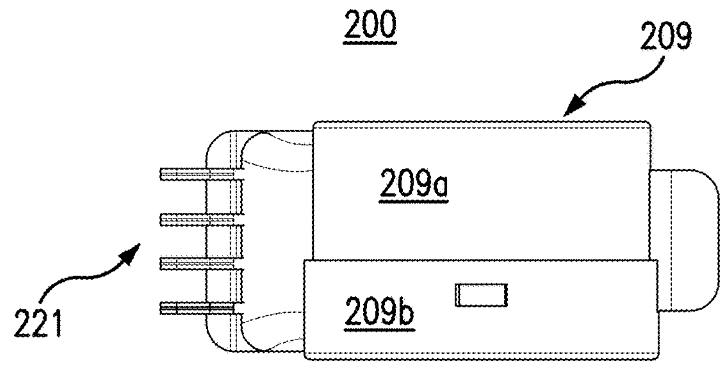
FIG. 2E is a bottom elevation view of the embodiment of FIG. 2A.
Figure 2F:
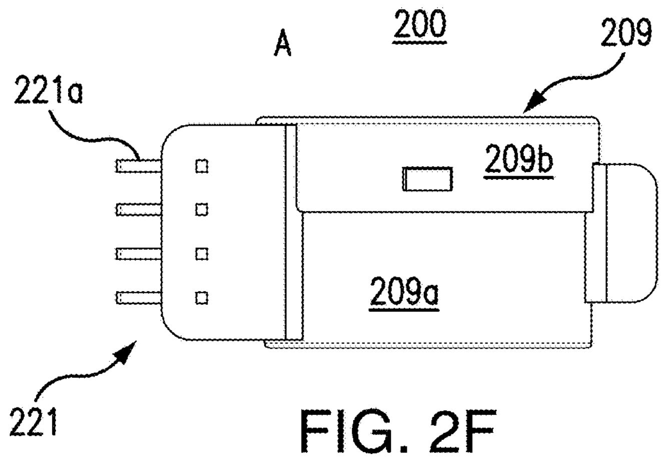
FIG. 2F is a top elevation view of the embodiment of FIG. 2A.
Figure 2G:
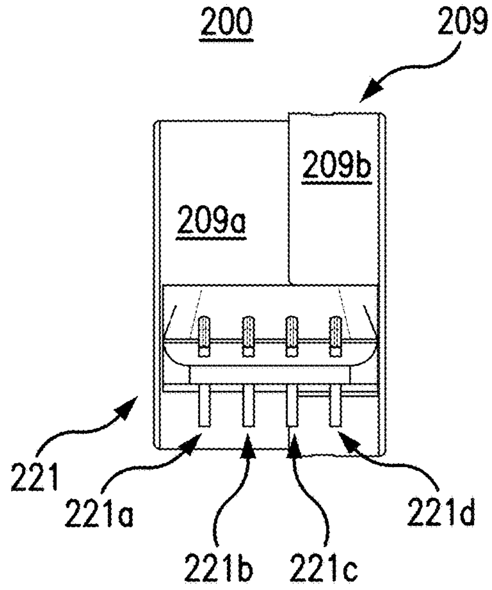
FIG. 2G is a side elevation view of the embodiment of FIG. 2A.
Figure 2H:
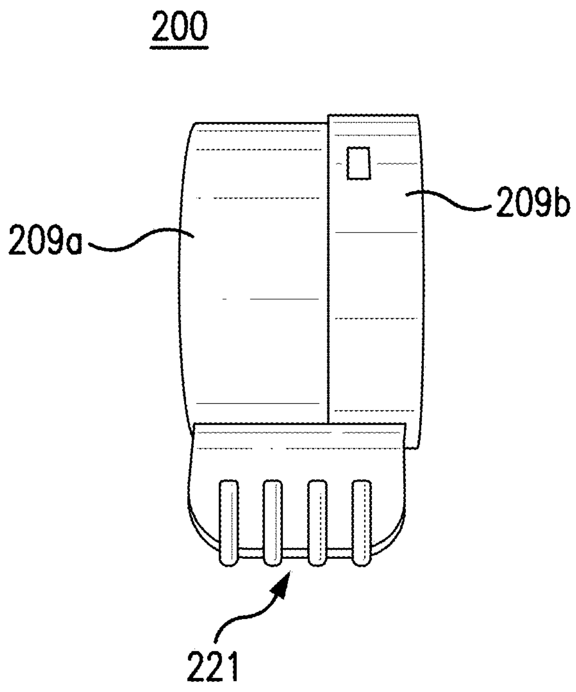
FIG. 2H is a side elevation view of the embodiment of FIG. 2A.
Figure 2I:
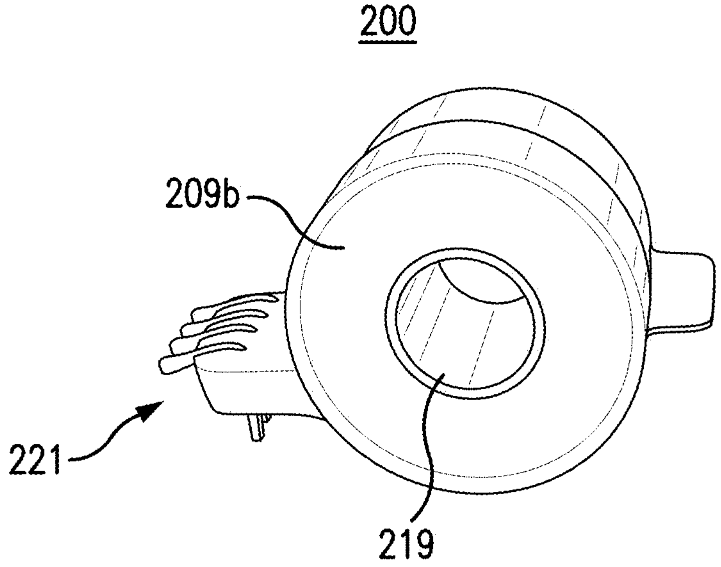
FIG. 2I is a front perspective view of the embodiment of FIG. 2A.
Figure 2J:
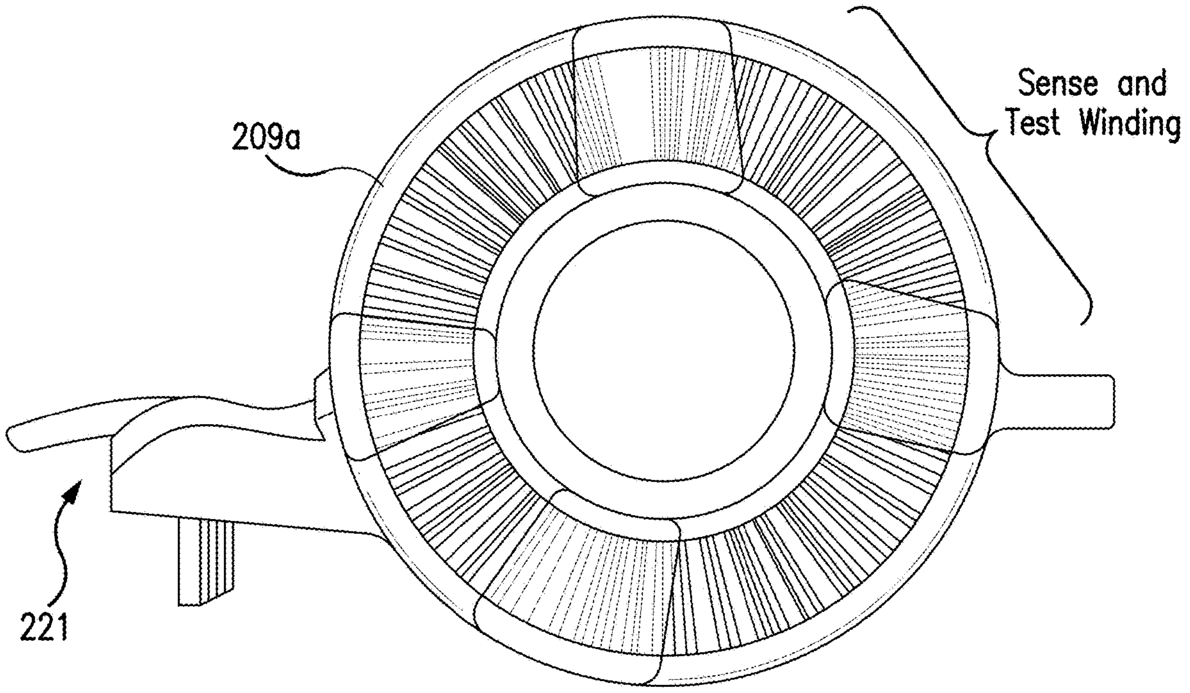
FIG. 2J is a front elevation view of the embodiment of FIG. 2A, showing a portion of a housing and a magnetic shield removed to reveal the core having the sense coil thereon.

In certain embodiments, the current transformer 100, 200 can include a third magnetic shield 119, 219 having a conduit shape disposed in the core opening 101*c*. The inner wall 111*b*, 211*b* can be disposed between the sense coil 103 and the third magnetic shield 119, 219, for example (e.g., when assembled as shown in FIGS. 1B and 2C). The conduit shape of the third magnetic shield 119, 219 can have an eyelet shape comprising a flange portion and a neck portion, e.g., as shown. The neck portion can be inserted into the core opening 101*c* as shown. The flange can act as an axial stop, for example. The third magnetic shield 119, 219 can be made of any suitable material (e.g., similar to the first magnetic shield 105, 205 and/or second magnetic shield 107, 207).

In certain embodiments, the first magnetic shield 205 and the second magnetic shield 207 can have the same dimensions. In certain embodiments, the first magnetic shield 205 and the second magnetic shield 207 can have different dimensions, e.g., as shown in the embodiment of FIG. 2A. For example, the first magnetic shield 205 and the second magnetic shield 207 can have different inner diameters (e.g., the second magnetic shield 207 can have a larger inner diameter than the first magnetic shield 205 as shown). Any suitable dimensions to produce a desired shielding is contemplated herein.

Figure 2K:
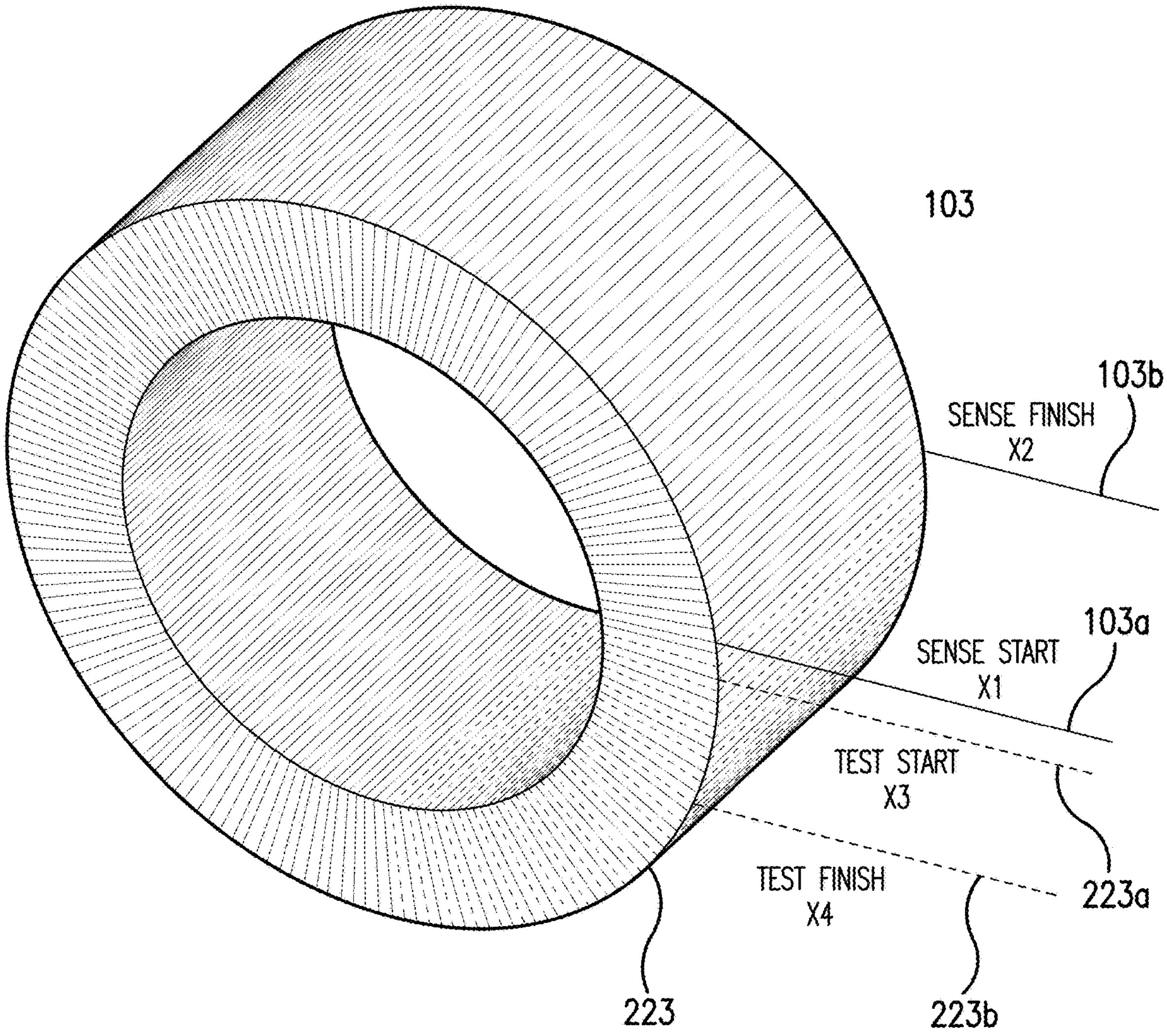
FIG. 2K is a perspective view of an embodiment of a sense coil and a test coil wound around a core.
Figure 2L:
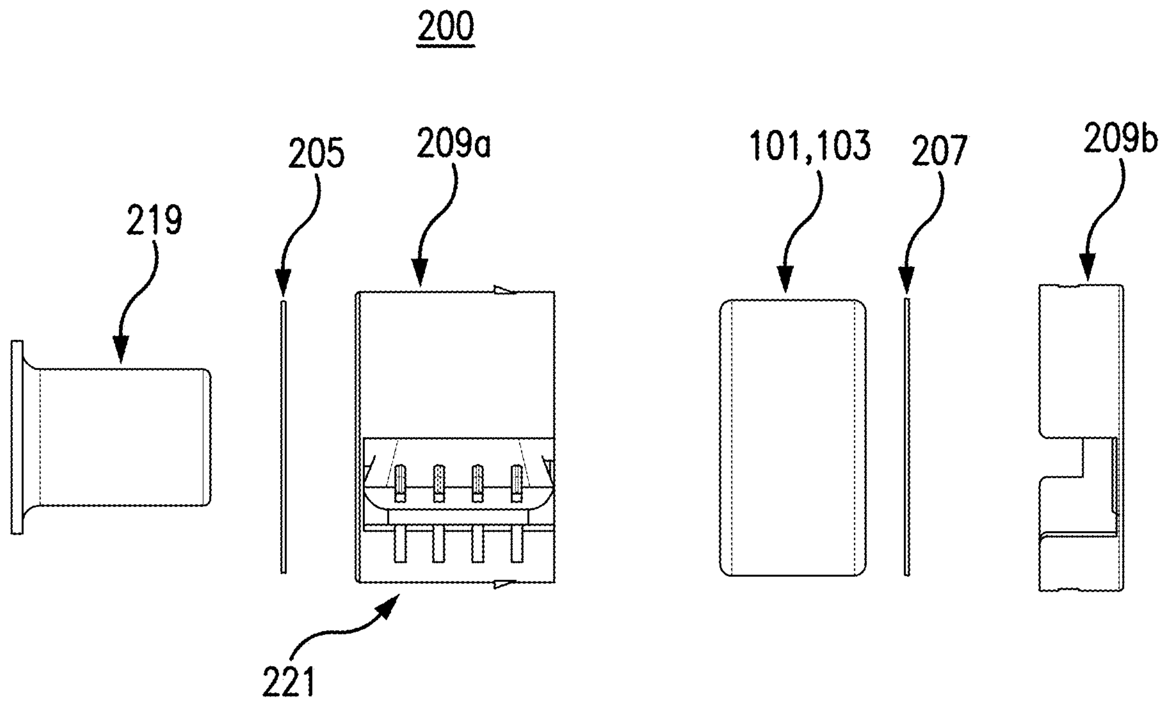
FIG. 2L shows an elevation exploded view of the embodiment of FIG. 2A.
Figure 2M:
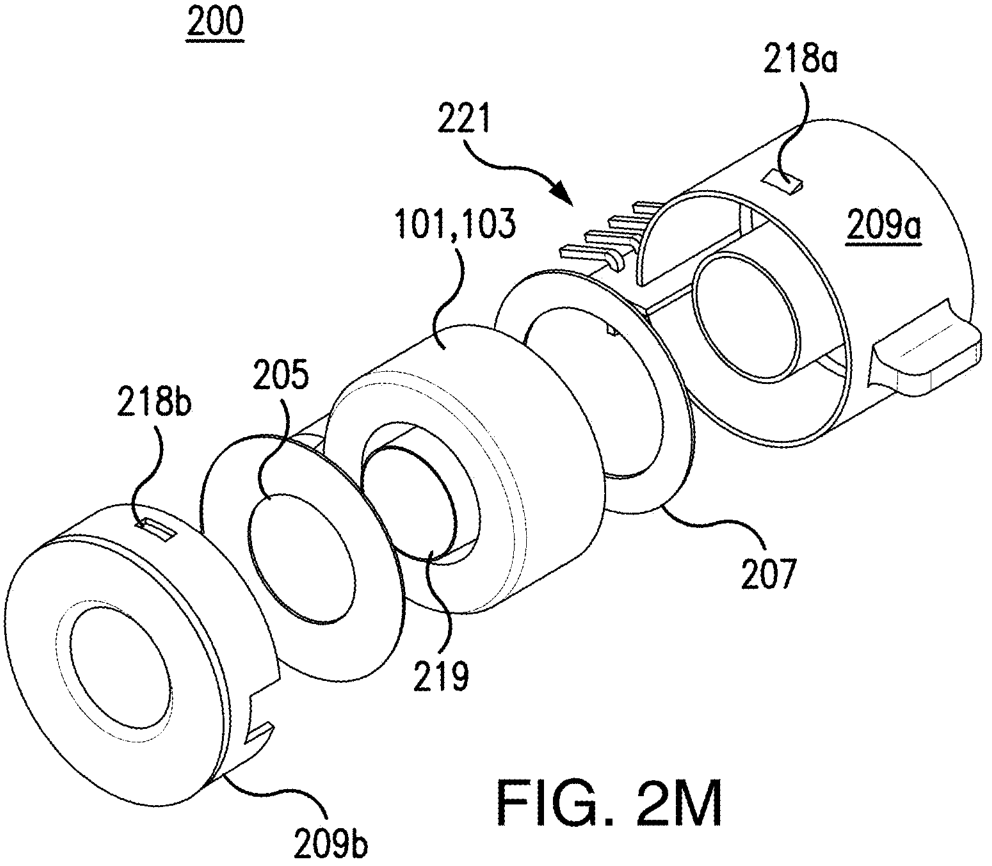
FIG. 2M shows a perspective exploded view of the embodiment of FIG. 2A.
Figure 2N:
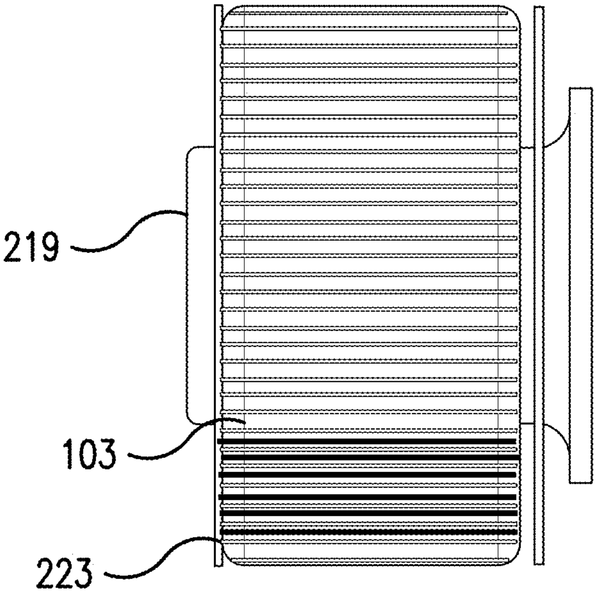
FIG. 2N illustrates an elevation view of the embodiment of FIG. 2A, shown with the housing removed.
Figure 2O:
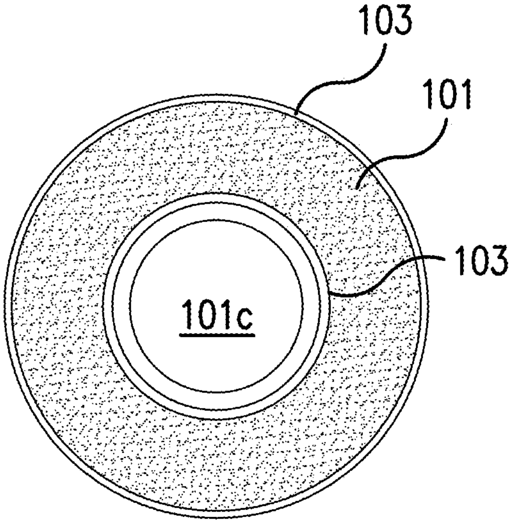
FIG. 2O illustrates a cross-sectional view of the view shown in FIG. 2O.
Figure 3A:
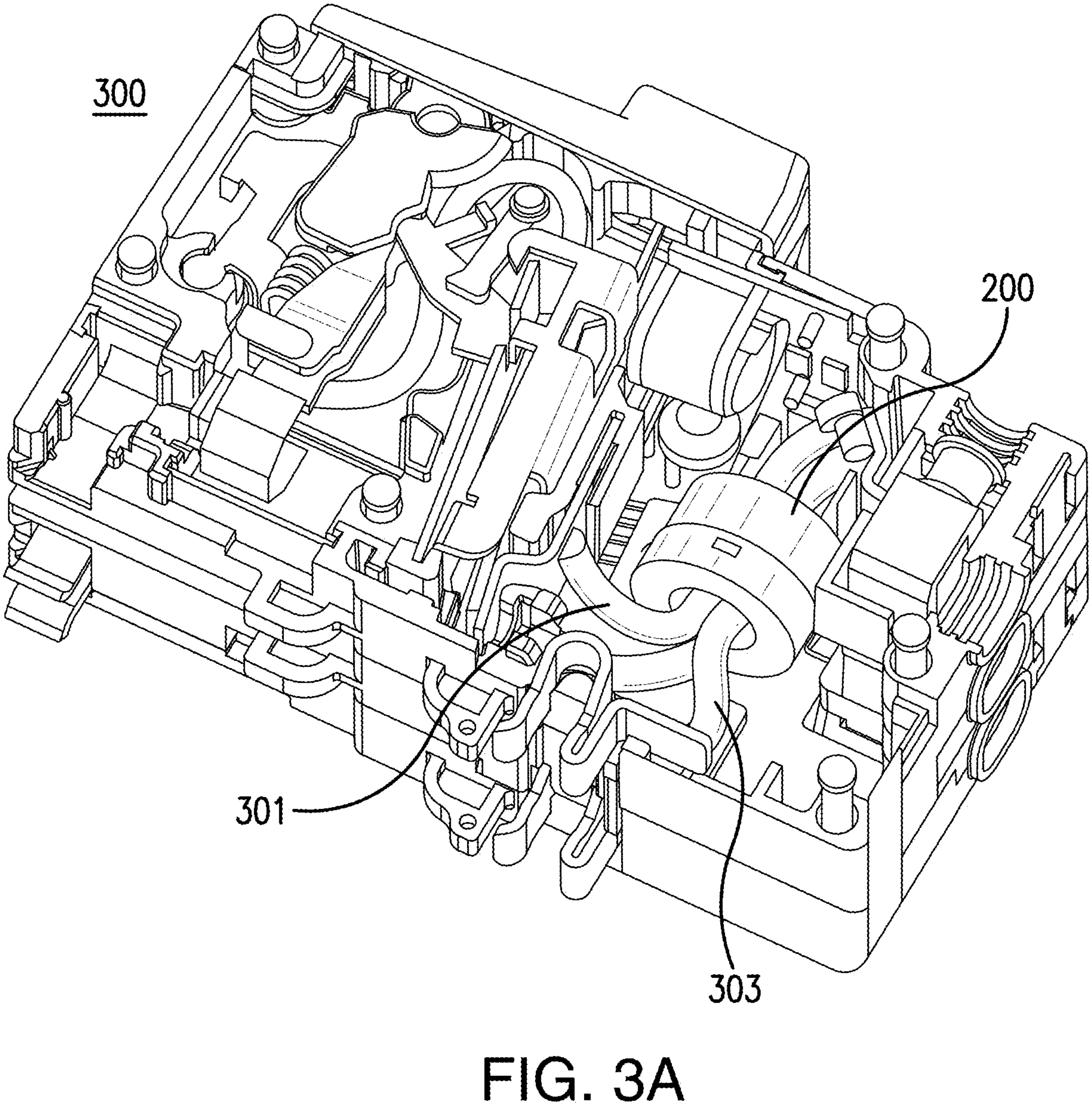
FIG. 3A is a perspective view of an embodiment of a ground fault circuit interrupter having the embodiment of FIG. 2A disposed therein.
Figure 3B:
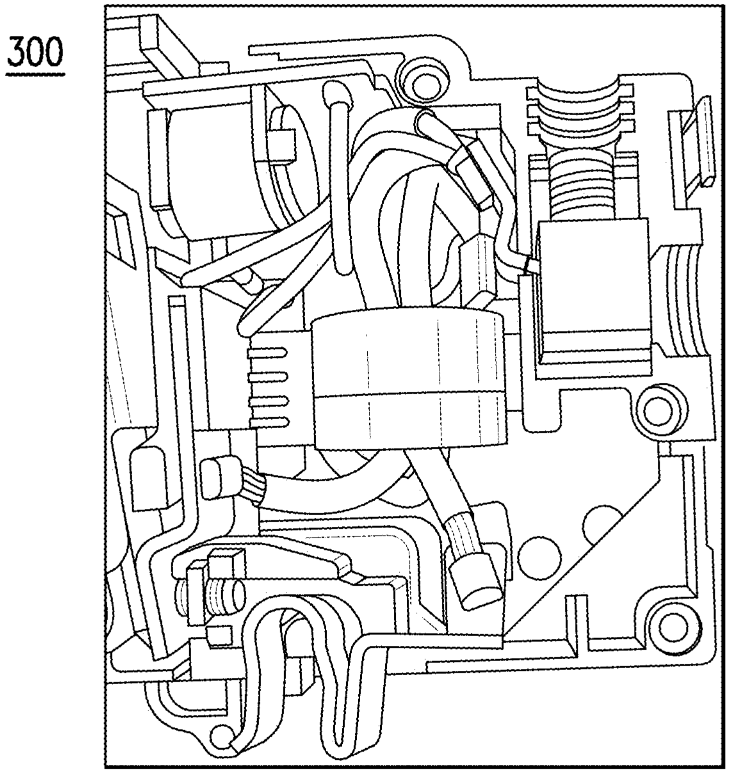
FIG. 3B is a partial plan view of the embodiment of FIG. 3A.
Figure 3C:
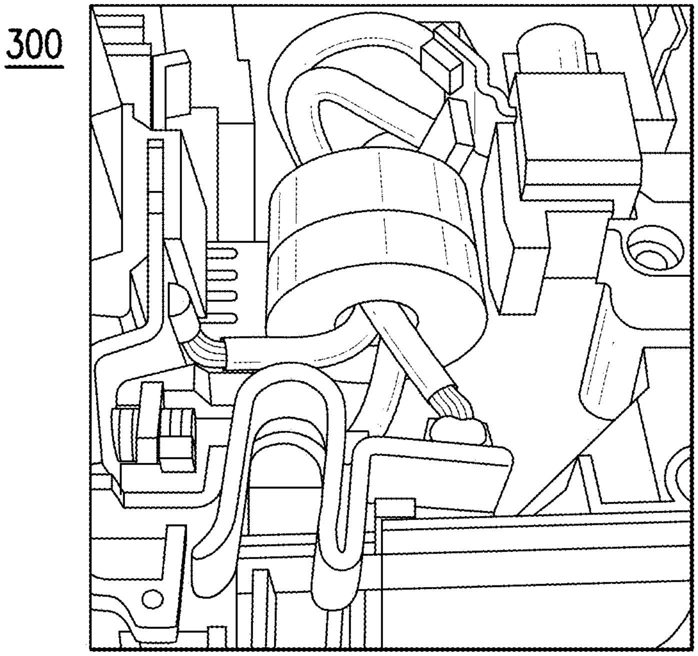
FIG. 3C is a partial front perspective view of the embodiment of FIG. 3A.
Figure 3D:
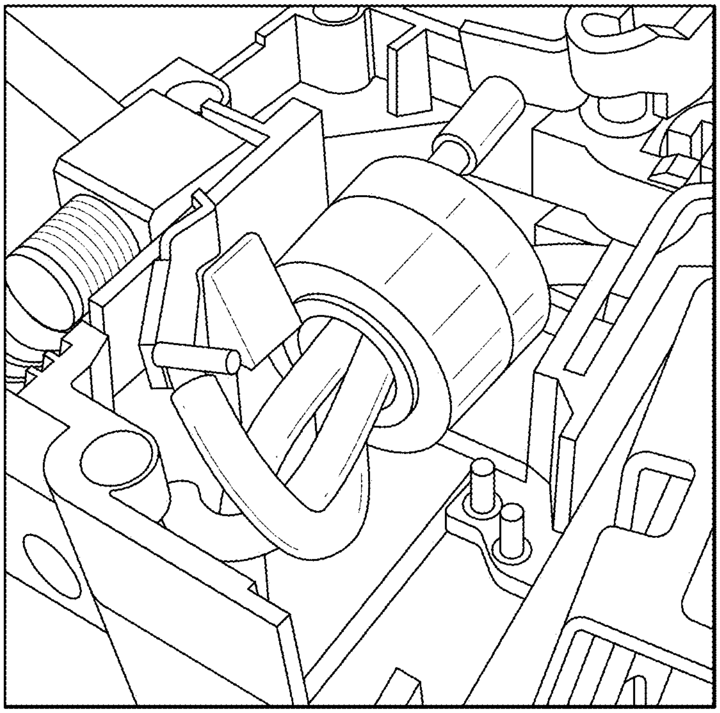
FIG. 3D is a partial rear perspective view of the embodiment of FIG. 3A.

In certain embodiments, the housing 109, 209 can define a plurality of terminal connections 121, 221 including a first sense terminal 121*a*, 221*a* and a second sense terminal 121*b*, 221*b* operatively connected to opposite ends 103*a*, 103*b* of the sense coil 103. In certain embodiments, e.g., as shown in the embodiment of FIG. 2A, the current transformer 200 can include a test coil 223 (e.g., as shown in FIGS. 2K and 2N) wrapped around a portion of the core 101 with the sense coil 103. The plurality of terminals 221 can include a first test terminal 221*c* and a second test terminal 221*d* operatively connected to opposite ends 223*a*, 223*b* of the test coil 223. In certain embodiments, the plurality of terminals 221 can be aligned in an axial direction, e.g., in a row as shown extending radially from the housing 209.

In accordance with at least one aspect of this disclosure, referring additionally to FIGS. 3A-3D, a GFCI 300 can include a first conductor 301 (e.g., a line, neutral, or ground), a second conductor 303 (e.g., a line, neutral, or ground), and a current transformer. The current transformer can be any suitable current transformer, e.g., 200 as disclosed above. The first conductor 301 and the second conductor 303 can pass through the core opening 101*c*, for example. Any suitable number of conductors for any suitable application are contemplated herein (e.g., three as shown). In accordance with at least one aspect of this disclosure, a GFCI can include a line conductor, a neutral conductor, and a current transformer, e.g., as disclosed above. The current transformer can include a sense coil 103 wrapped around the core 101 configured to magnetically couple to the line conductor and the neutral conductor passing through the core opening 101*c*. The GFCI can include a test coil 223 wrapped (e.g., partially) around the core 101 and configured to magnetically couple to the sense coil 103 through the core 101 to provide a test signal to the sense coil 103. The current transformer 200 can include a first, second, and/or third shield as disclosed above, for example.

Figure 4:
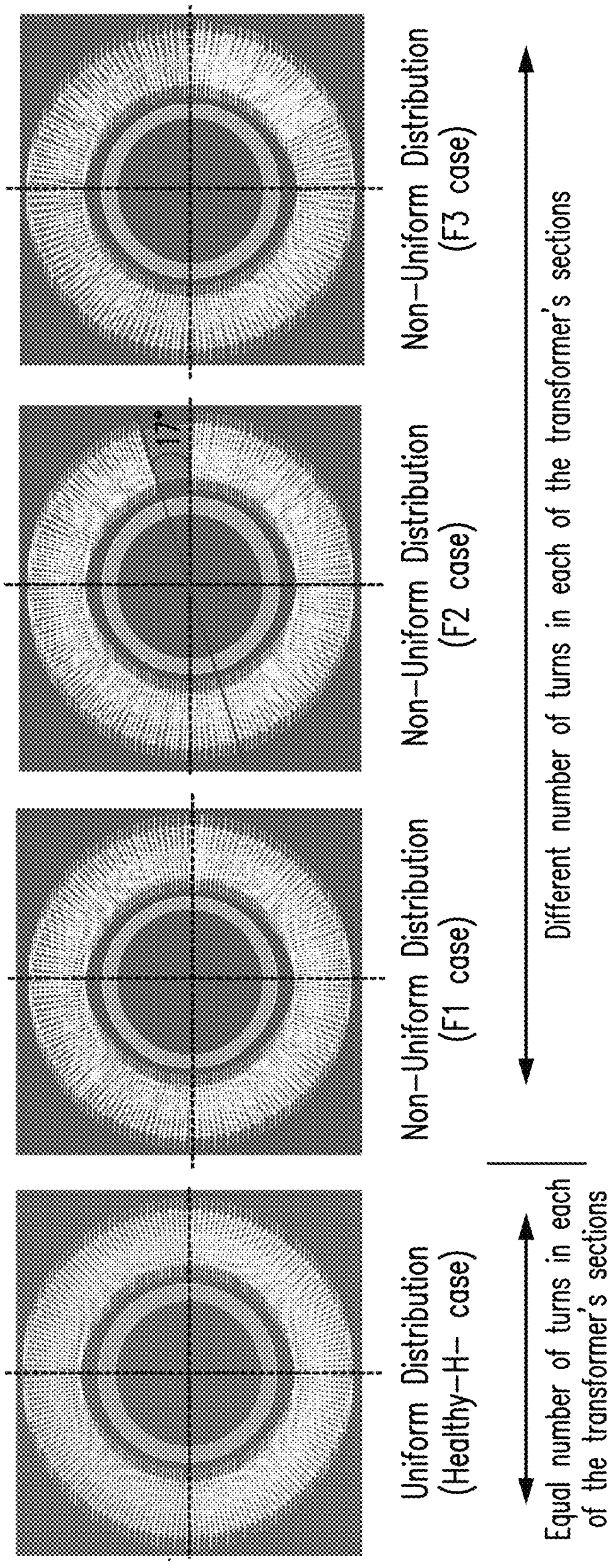
FIG. 4 shows a comparison of coil distributions, showing a uniform distribution on the left and three different types of non-uniform coils around a toroidal core.
Figure 5:
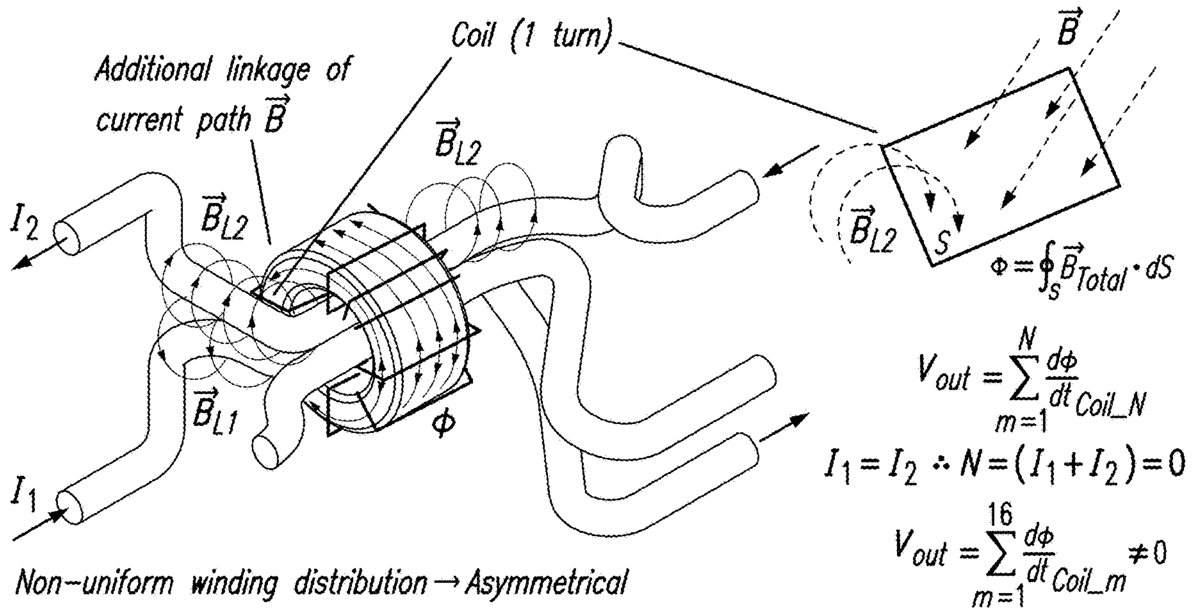
FIG. 5 is a schematic diagram of an arrangement having a current transformer with a non-uniform coil wrapped around a core, and three conductors passing through the core opening also causing wrap-around effects.
Figure 6:
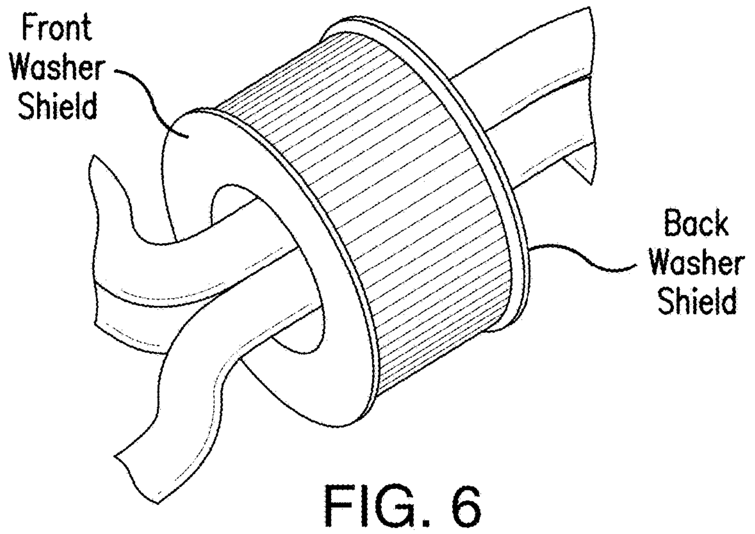
FIG. 6 is a perspective view of the arrangement of FIG. 5, showing having a first magnetic shield and a second magnetic shield.

FIG. 4 shows a comparison of coil distributions, showing a uniform distribution on the left and three different types of non-uniform coils around a toroidal core. FIG. 5 is a schematic diagram of an arrangement having a current transformer with a coil (e.g., non-uniform or uniform) wrapped around a core, and three conductors passing through the core opening also causing wrap-around effects. FIG. 6 is a perspective view of the arrangement of FIG. 5, showing having a first magnetic shield and a second magnetic shield.

Figure 7:
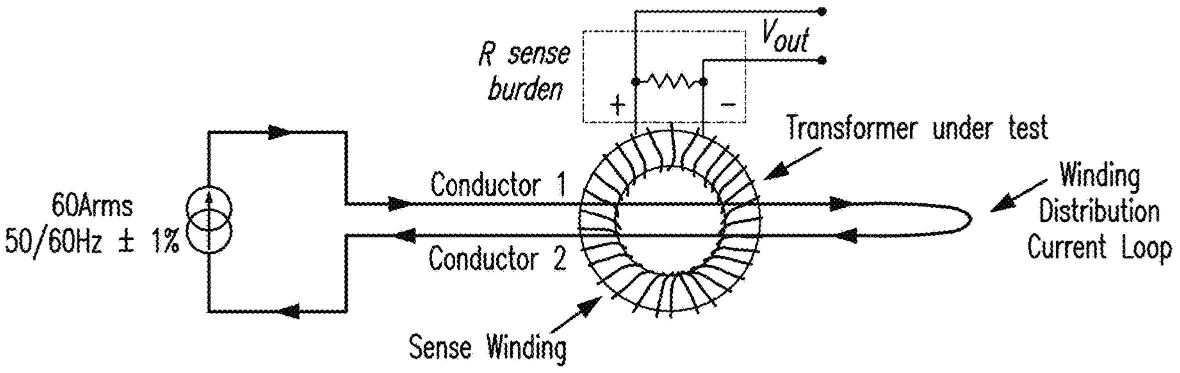
FIG. 7 is a schematic diagram of an embodiment of a test structure for evaluating coil distribution effects.
Figure 8:
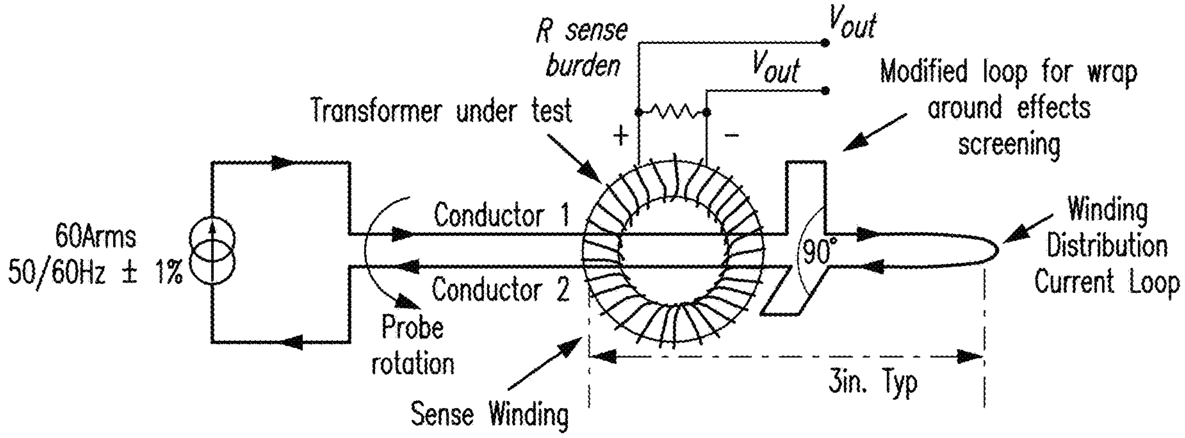
FIG. 8 is a schematic diagram of an embodiment of a test structure for evaluating coil distribution effects and wrap-around effects.
Figure 9:
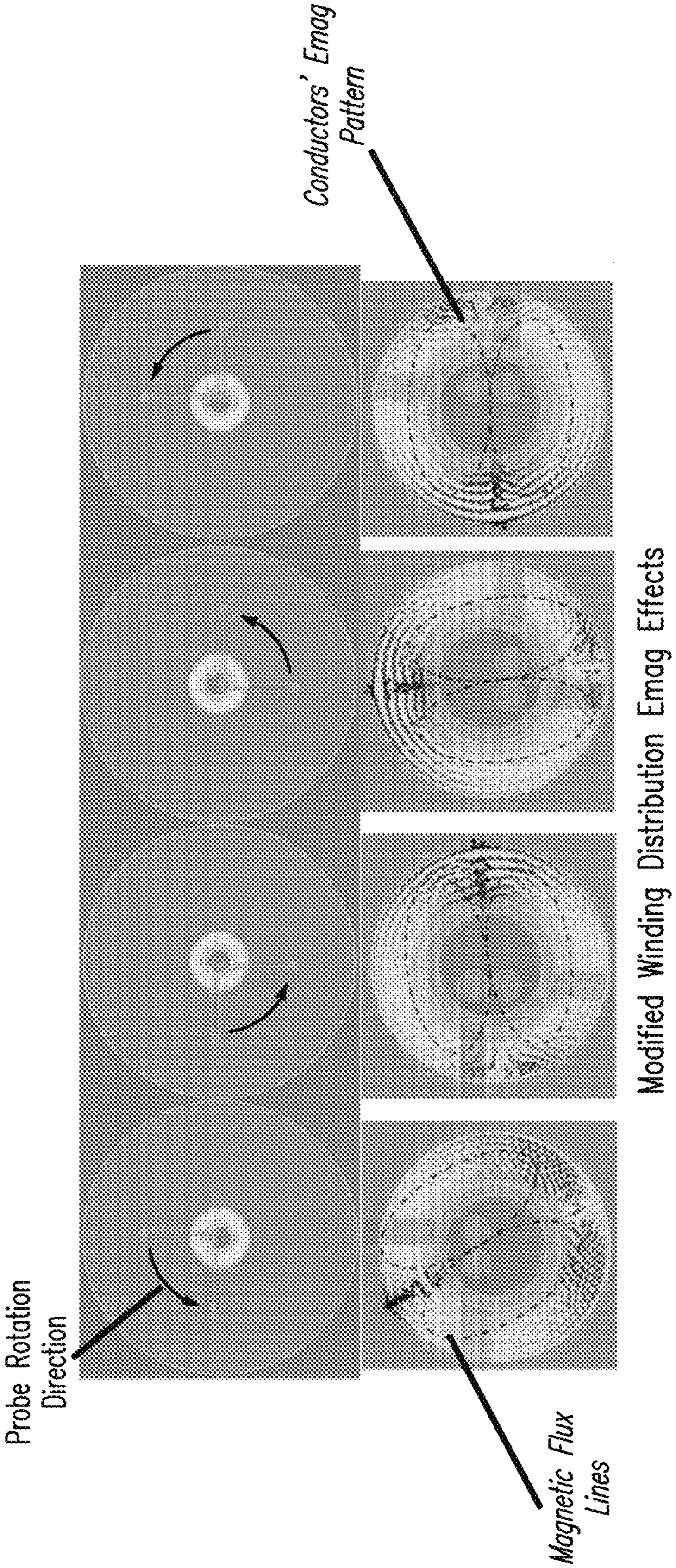
FIG. 9 shows a cross-sectional view of the embodiment of FIG. 8 in use, showing a probe rotation and dual conductor position within the current transformer at four different positions.

FIG. 7 is a schematic diagram of an embodiment of a test structure for evaluating coil distribution effects. FIG. 8 is a schematic diagram of an embodiment of a test structure for evaluating coil distribution effects and wrap-around effects. The two conductors can be offset from center in the current transformer for example, and there can be bent conductors outside of the current transformer for providing wraparound effects. FIG. 9 shows a cross-sectional view of the embodiment of FIG. 8 in use, showing a probe rotation and dual conductor position within the current transformer at four different positions.

Figure 10:
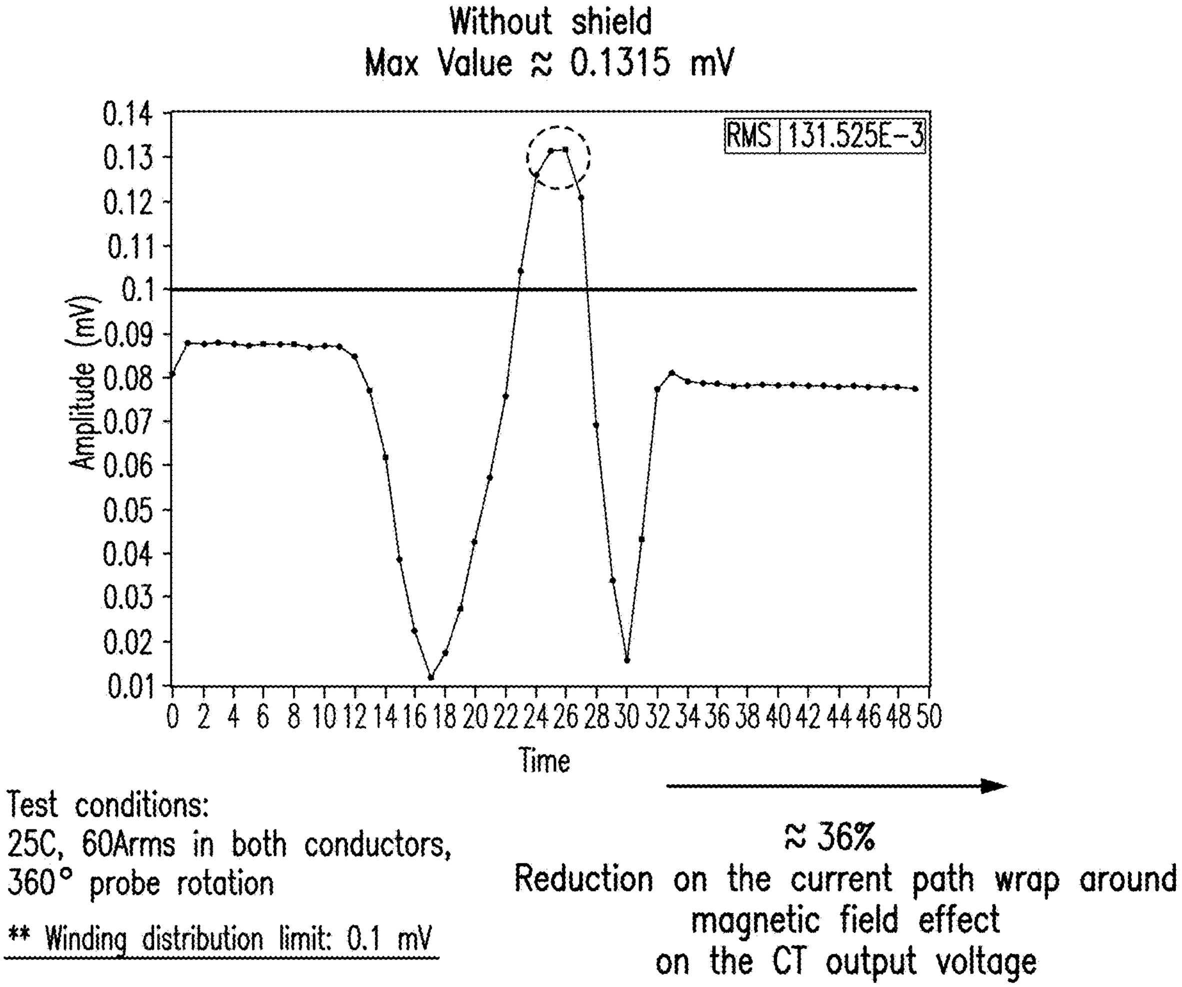
FIG. 10 shows experimental results charted for comparison of an unshielded current transformer versus a shielded current transformer in accordance with this disclosure, each chart showing voltage versus time with the rotation and arrangement shown in FIG. 9.
Figure 10:
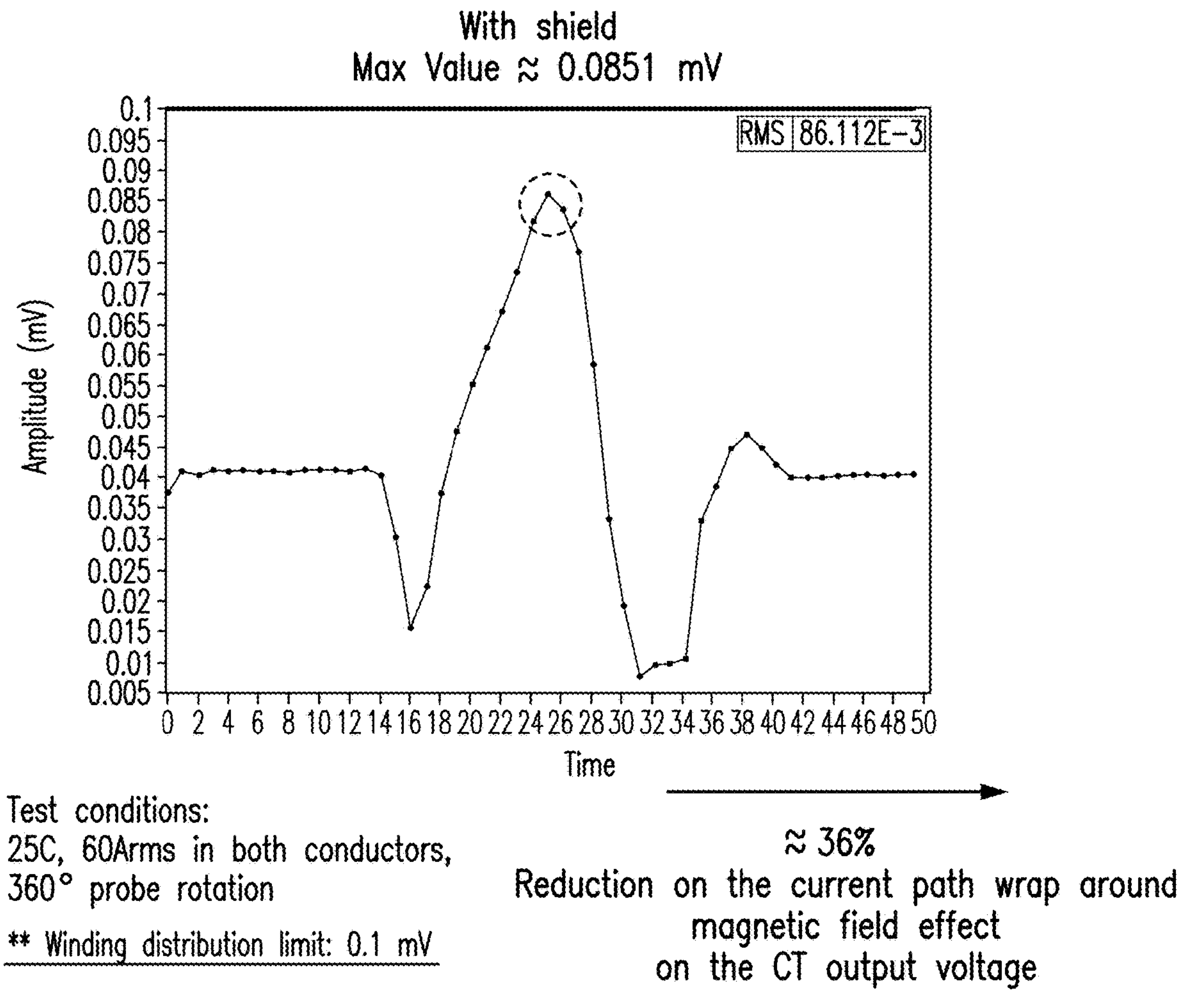

FIG. 10 shows experimental results charted for comparison of an unshielded current transformer versus a shielded current transformer in accordance with this disclosure, each chart showing voltage versus time with the rotation and arrangement shown in FIG. 9. As shown, the shielding the current transformer with the first, second, and third magnetic shields causes a reduction in peak voltage attributed to non-uniform coil and wraparound effects. The result is less than the shown maximum of 0.1 mV whereas without shielding is above the maximum of 0.1 mV. The results show a substantial percentage reduction in peak voltage, irrespective of the set maximum. Any other suitable maximum is contemplated herein.

Figure 11:
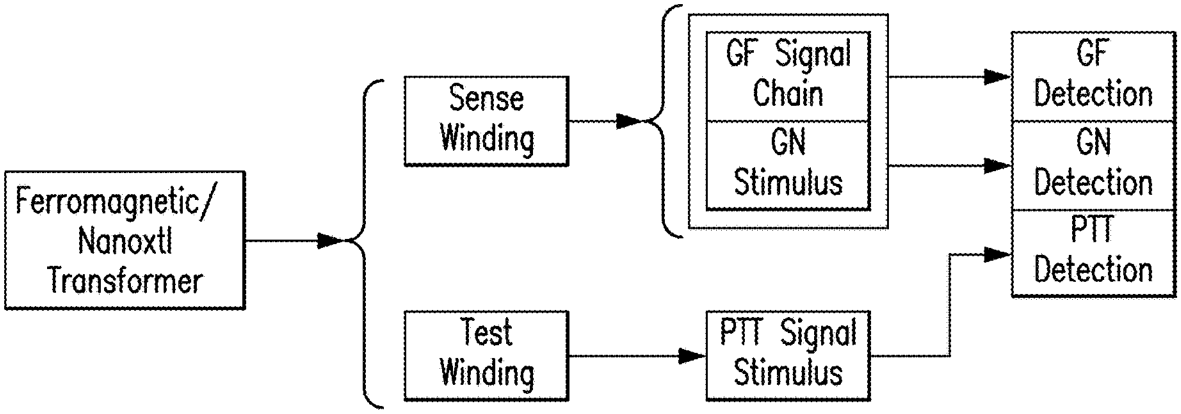
FIG. 11 shows a schematic diagram of an embodiment of an GFCI having a current transformer with a single core and multiple coils, wherein ground fault detection and grounded neutral detection are both operated on a sense coil and a test signal is sent on a test coil.
Figure 12:
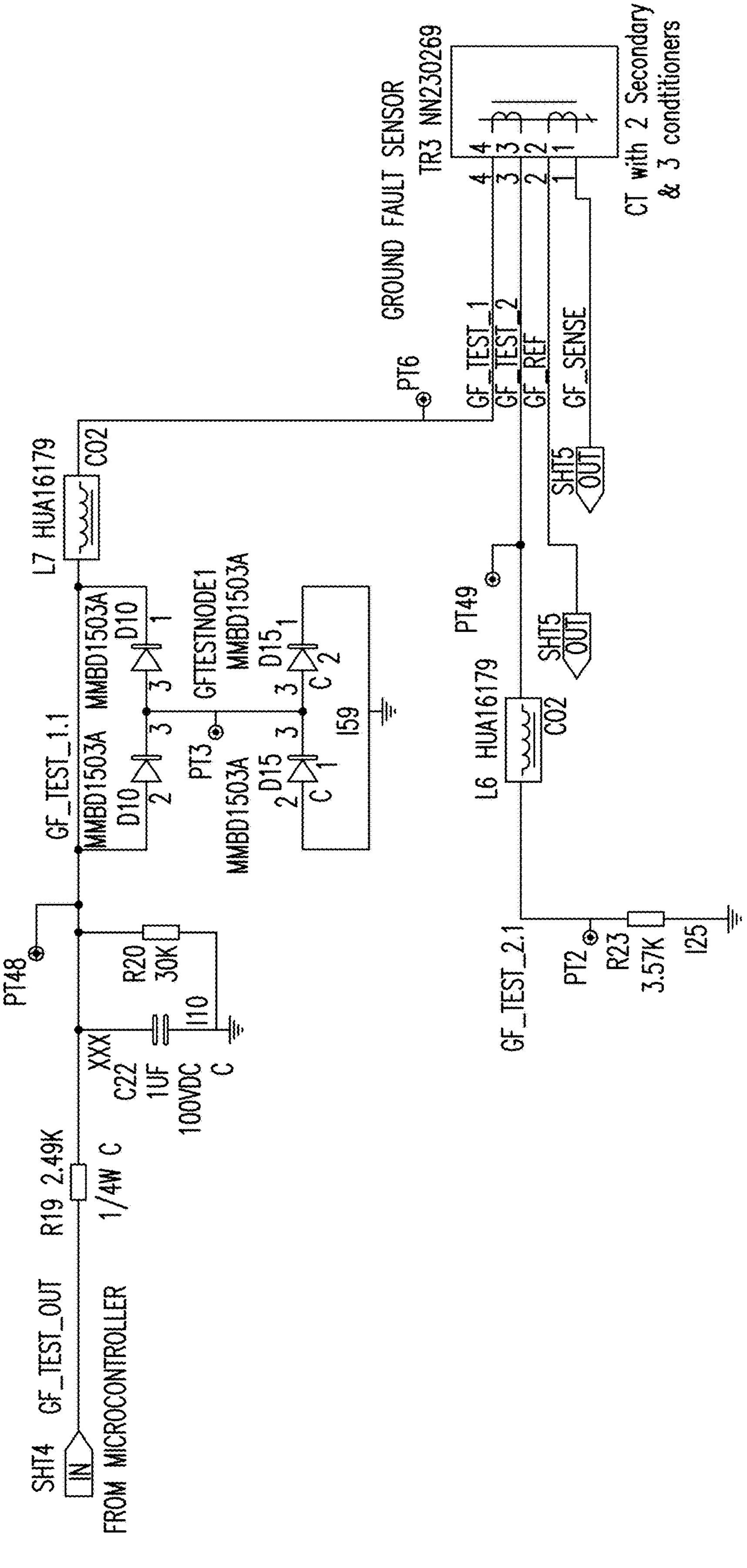
FIG. 12 shows an embodiment of a circuit diagram of the embodiment of FIG. 11.
Figure 13:
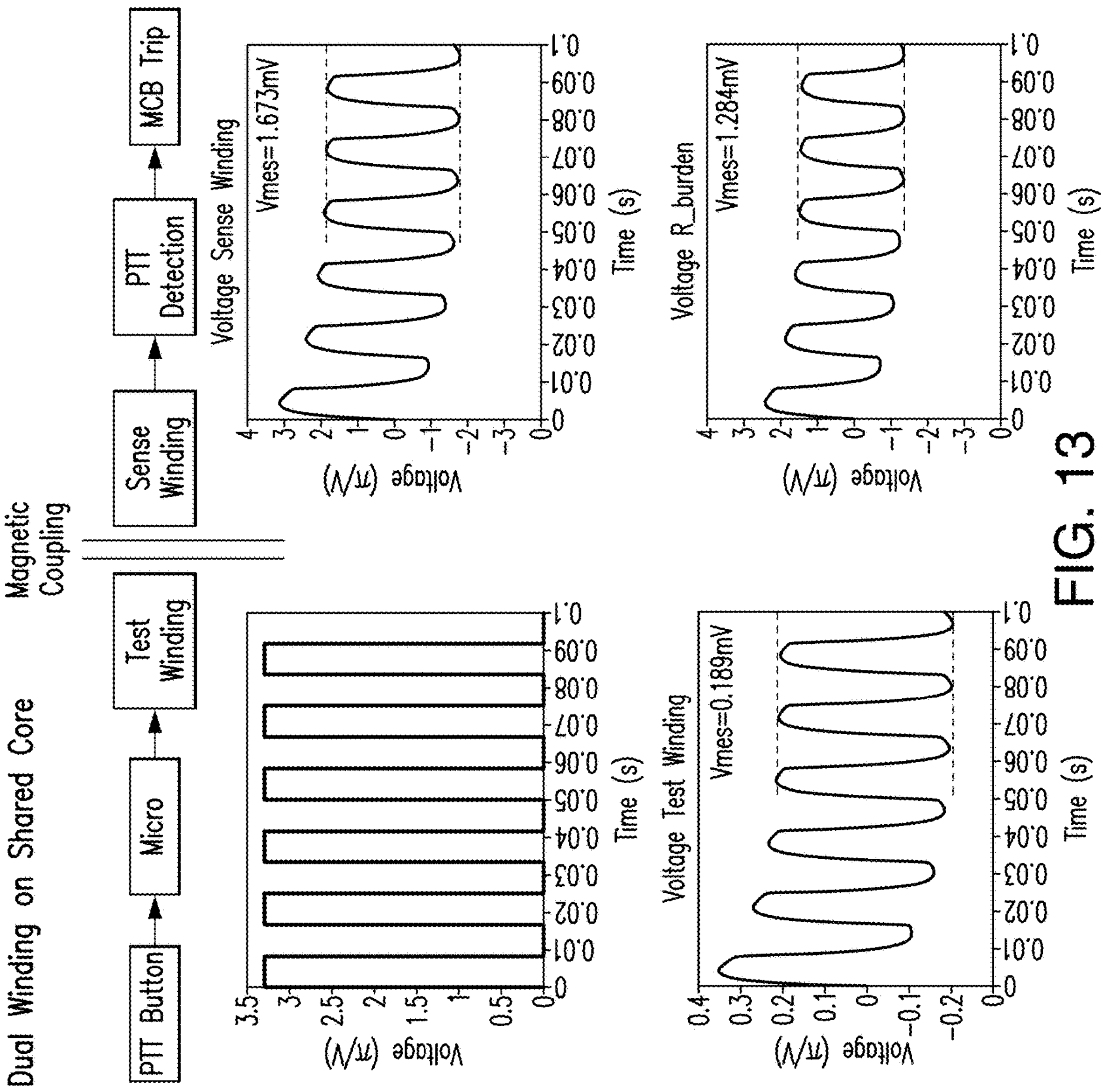
FIG. 13 illustrates an embodiment of a test signal scheme utilizing the embodiment of FIGS. 11 and 12, shown using a micro-processor to generate a waveform to be sent through the test coil and coupled onto the sense coil to be received by a test detection module to determine a test has occurred and/or whether the GFCI is functioning properly.

FIG. 11 shows a schematic diagram of an embodiment of a GFCI having a current transformer with a single core and multiple coils. Ground fault detection and grounded neutral detection are shown as both operating on a sense coil and a test signal is sent on a test coil which is magnetically coupled to the sense coil. FIG. 12 shows an embodiment of a circuit diagram of the embodiment of FIG. 11. FIG. 13 illustrates an embodiment of a test signal scheme utilizing the embodiment of FIGS. 11 and 12, shown using a microprocessor to generate a waveform to be sent through the test coil and coupled onto the sense coil to be received by a test detection module to determine a test has occurred and/or whether the GFCI is functioning properly.

In accordance with this disclosure, coil distribution is defined by how a coil is geometrically turned around a core. Imbalanced coil is when there are more or less turns around a particular portions of the core which can cause improper current in a sense coil due to this asymmetry. Such undesired current can be further exacerbated by wires outside of the current transformer that cause wrap-around effects (e.g., fields of conductors outside of the current transformer that induce a current in the sense coil). Embodiments can include magnetic shielding to mitigate these effects. For example, embodiments can include two washer shaped shieldings and an inner diameter insert to further shield. The inner diameter insert can be useful for load shift applications, e.g., for whenever there are different magnetic fields from parallel wires passing through the current sensor, such that the inner diameter insert can mitigate the effect of non-concentric wires.

Embodiments of a method can include one or more of securing a wound core (e.g., 101, 103) into housing with material (e.g., adhesive, plastic, or any other suitable retainer), orienting the core such that as it is being installed into housing, the finish wire is coming from the outer diameter and the start wire is coming from the inner diameter, routing a start lead along corner and away from finish lead pin, routing the finish lead over and away from start lead such that the start and finish leads should not touch, fitting a first shield into the housing over a housing inner wall (e.g., a tube), fitting a second shield onto the inner wall tube until seated against the wound core, and/or securing a first shield and second shield onto the end of core 101 using a thin bead of material applied to the outside edge of core 101. Embodiments of a method can include soldering terminals (e.g., and then test per a set specification). Embodiments can have 4 lbs minimum force to move pins after the terminals are soldered and seated. Lead wires can be be provided with stress relief, and can be coated from the housing to the pins with a suitable material. Embodiments of a method can include pressing the third shield into housing until a bottom of a flange of the shield seats on a face of housing, for example. Wires can have a visible strain relief loop. Embodiments of a method can include securing the third shield into the housing with the material, e.g., as described above. A location of the start/finish leads of the sense coil can be determined by a coil position which yields the lowest coil distribution test result, for example.

Certain embodiments can include a dual coil, shielded, grounded fault current transformer. A current path's magnetic influence over the current transformer output voltage can be controlled by using a magnetic shielding near the sensor. Such shields can face the current path and capture stray magnetic flux or unwanted energy.

Certain embodiments can include a magnetic shield structure for a toroidal transformer. Certain embodiments can include two or three magnetic shield structures that exert a high shield effect on the magnetic flux generated by the current path. Certain embodiments can mitigate for inconsistent detection of the ground faults under handle rated load conditions. Certain embodiments can include sandwiching a wound core between two ferrous washers to reduce unintended flux interactions between the primary current path and the wound core (e.g., a copper wire wrapped nanocrystalline core).

Certain embodiments can include a sense coil having many turns, e.g., about 176 turns. Coil distribution can be defined as a geometrical distribution of the total number of turns around the transformer's core (e.g., around 360°). FIG. 4 shows a side by side comparison of different coil distributions. Wrap around effects can be defined as the magnetic influence of nearby conductors (wrap around effect). FIG. 5 illustrates wrap around effects from conductors associated with the current transformer.

A random distribution of turns of the coil in combination with wrap around effects results in an output voltage, Vout, with a magnitude different than zero that has a considerably higher value compared to the ideal case (e.g., a uniform coil distribution). Vout is the result of the sum of each turn's induced current (each one with either positive or negative magnitude) and each turn's contribution highly depends on its physical location around the core and with respect to the line conductors (L1 and L2) or neutral (N) conductor. To reduce the influence of nearby conductors, embodiments can include shielding of high permeable material (e.g., steel or mu-metal) in the shape of a washer.

Coil distribution screening has the objective of verifying the sensor's output voltage deviation (quantification of Vot magnitude as in a randomly distributed coil is #OV) under the presence of a balanced 60A current flowing out through and returning through the center of the current transformer (current loop). Wrap around effects screening mimics the effects of the current path over the current transformer (CT).

As shown above with respect of FIGS. 7-10, an eccentric probe that has two conductors rotates and creates an electromagnetic effect over the CT. The CT varies its output voltage depending on the location of the conductors at any time due to the random asymmetric coil. This screening has the possibility of checking the coil distribution and the wrap around effects at the same time on the CT. The process can then resumes on finding the maximum Vot during a 360° rotation and checking that is below a defined limit (e.g., 0.1 mV as shown in FIG. 10). FIG. 10 shows that the CT equipped with magnetic shields performs significantly better than without shielding, and the difference between peak and trough is reduced as well as magnitude of the highest peak. Embodiments can also have a dual coil on shared core and retain the benefits of the shielding.

Certain embodiments can include magnetic shielding for a ground fault protection core. Magnetic shielding reduces interference from unwanted flux sources that interfere with accurate ground fault detection. Embodiments as shown in FIG. 11 can also include a push-to-test signal decoupling function that is more controllable and repeatable with a lower likelihood of field non-conformances due to standing ground faults. As shown in FIGS. 12-13, embodiments can include a self-test methodology that is controlled and generated by the microcontroller. Embodiments can reduce the likelihood of a self-test functionality being impacted by external factors since it can be controlled by a microcontroller and applied through the additional CT coil. Embodiments can provide increased protection from magnetic interference due to manufacturing inconsistencies and wire path routing variations, as well as increased consistency in field performance due to low level standing ground faults. In certain embodiments, the additional test coil makes the self-test functionality of the ground fault detection circuit voltage, frequency, and current independent, making the function more controllable and repeatable with a lower likelihood of field non-conformances due to standing ground faults.

Embodiments can include any suitable computer hardware and/or software module(s) to perform any suitable function (e.g., as disclosed herein). As will be appreciated by those skilled in the art, aspects of the present disclosure may be embodied as a system, method or computer program product. Accordingly, aspects of this disclosure may take the form of an entirely hardware embodiment, an entirely software embodiment (including firmware, resident software, micro-code, etc.), or an embodiment combining software and hardware aspects, all possibilities of which can be referred to herein as a "circuit," "module," or "system." A "circuit," "module," or "system" can include one or more portions of one or more separate physical hardware and/or software components that can together perform the disclosed function of the "circuit," "module," or "system", or a "circuit," "module," or "system" can be a single self-contained unit (e.g., of hardware and/or software). Furthermore, aspects of this disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of this disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of this disclosure may be described above with reference to flowchart illustrations and/or block diagrams of methods, apparatus (systems) and computer program products according to embodiments of this disclosure. It will be understood that each block of any flowchart illustrations and/or block diagrams, and combinations of blocks in any flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in any flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified herein.

Those having ordinary skill in the art understand that any numerical values disclosed herein can be exact values or can be values within a range. Further, any terms of approximation (e.g., "about", "approximately", "around") used in this disclosure can mean the stated value within a range. For example, in certain embodiments, the range can be within (plus or minus) 20%, or within 10%, or within 5%, or within 2%, or within any other suitable percentage or number as appreciated by those having ordinary skill in the art (e.g., for known tolerance limits or error ranges).

The articles “a”, “an”, and “the” as used herein and in the appended claims are used herein to refer to one or to more than one (i.e., to at least one) of the grammatical object of the article unless the context clearly indicates otherwise. By way of example, “an element” means one element or more than one element.

The phrase “and/or,” as used herein in the specification and in the claims, should be understood to mean “either or both” of the elements so conjoined, i.e., elements that are conjunctively present in some cases and disjunctively present in other cases. Multiple elements listed with “and/or” should be construed in the same fashion, i.e., “one or more” of the elements so conjoined. Other elements may optionally be present other than the elements specifically identified by the “and/or” clause, whether related or unrelated to those elements specifically identified. Thus, as a non-limiting example, a reference to “A and/or B”, when used in conjunction with open-ended language such as “comprising” can refer, in one embodiment, to A only (optionally including elements other than B); in another embodiment, to B only (optionally including elements other than A); in yet another embodiment, to both A and B (optionally including other elements); etc.

As used herein in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used herein shall only be interpreted as indicating exclusive alternatives (i.e., “one or the other but not both”) when preceded by terms of exclusivity, such as “either,” “one of,” “only one of,” or “exactly one of.”

Any suitable combination(s) of any disclosed embodiments and/or any suitable portion(s) thereof are contemplated herein as appreciated by those having ordinary skill in the art in view of this disclosure.

The embodiments of the present disclosure, as described above and shown in the drawings, provide for improvement in the art to which they pertain. While the subject disclosure includes reference to certain embodiments, those skilled in the art will readily appreciate that changes and/or modifications may be made thereto without departing from the spirit and scope of the subject disclosure.

What is claimed is:

1. A current transformer for a ground fault circuit interrupter (GFCI), comprising:

- a core having a loop shape having a first side, a second side, and a core opening;
- a sense coil wrapped around the core configured to magnetically couple to a plurality of conductors passing through the core opening;
- a first magnetic shield on the first side of the core over the sense coil;
- a second magnetic shield on a second side of the core over the sense coil; and
- a housing of an electrically insulating material and configured to hold and/or enclose the first magnetic shield and the second magnetic shield with the core and sense coil, wherein the housing includes an outer wall extending around a main axis, wherein the first magnetic shield and the second magnetic shield are radially inward from the outer wall of the housing relative to the main axis, further comprising a third magnetic shield having a conduit shape in the core opening, wherein the housing includes an inner wall that extends into the core opening, wherein the inner wall is between the sense coil and the third magnetic shield, wherein the outer wall and the inner wall define a core aperture having a complementary shape to the core and configured to receive the core therein, wherein the first magnetic shield is within the core aperture, wherein the first magnetic shield is on the sense coil and/or bonded to the sense coil, wherein the housing defines a shield aperture separated from the core aperture by a dividing wall extending between the outer wall and the inner wall of the housing, wherein the second magnetic shield is in the shield aperture and separated from the sense coil and the core by the dividing wall.

2. The current transformer of claim 1, wherein the closed loop shape is a toroid shape.

3. The current transformer of claim 1, wherein the first magnetic shield and the second magnetic shield are washer shaped or complementary shaped to the core.

4. The current transformer of claim 3, wherein the first magnetic shield and the second magnetic shield comprise ferromagnetic material.

5. The current transformer of claim 1, wherein conduit shape of the third magnetic shield is an eyelet shape comprising a flange portion and a neck portion.

6. The current transformer of claim 5, wherein the neck portion is inserted into the core opening, wherein the flange acts as an axial stop.

7. The current transformer of claim 1, wherein the housing is a single piece of material.

8. The current transformer of claim 1, wherein the housing includes a first portion and a second portion configured to assemble together to contain the core, the sense coil, and at least one of the first magnetic shield and the second magnetic shield.

9. The current transformer of claim 1, wherein the housing defines a plurality of terminal connections including a first sense terminal and a second sense terminal operatively connected to opposite ends of the sense coil.

10. The current transformer of claim 9, further comprising a test coil wrapped around a portion of the core with the sense coil, wherein the plurality of terminal connections include a first test terminal and a second test terminal operatively connected to opposite ends of the test coil.

11. The current transformer of claim 10, wherein the plurality of terminal connections are aligned in an axial direction.

12. The current transformer of claim 1, wherein the inner wall and the outer wall form tube shapes complementary to the loop shape of the core, wherein the loop shape of the core includes one of a closed loop shape, a segmented loop shape, a circular hoop shape, a toroid, or a square hoop shape.

13. A current transformer for a ground fault circuit interrupter (GFCI), comprising:

- a core having a loop shape having a first side, a second side, and a core opening;
- a sense coil wrapped around the core configured to magnetically couple to a plurality of conductors passing through the core opening;

a first magnetic shield on the first side of the core over the sense coil; and a second magnetic shield on a second side of the core over the sense coil, wherein the first magnetic shield defines a first through-hole aperture with a first radius, and the second magnetic shield defines a second through-hole aperture with a second radius different from the first radius, a third magnetic shield having a conduit shape and located in the core opening, wherein the first radius of the first through-hole aperture of the second magnetic shield is larger than the first through-hole aperture radius of the first magnetic shield to provide space for the third magnetic shield.

14. A ground fault circuit interrupter (GFCI) comprising:

a line conductor;

a neutral conductor;

a current transformer, comprising:

a core having a closed loop shape having a first side, a second side, and a core opening, wherein the line conductor and the neutral conductor pass through the core opening;

a sense coil wrapped around the core configured to magnetically couple to the line conductor and the neutral conductor passing through the core opening;

a first magnetic shield on the first side of the core over the sense coil; and a second magnetic shield on a second side of the core over the sense coil; and a housing of an electrically insulating material and configured to hold and/or enclose the first magnetic shield and the second magnetic shield with the core and sense coil, wherein the housing extends around a main axis and has an H-shaped radial cross-section relative to the main axis.

15. A ground fault circuit interrupter (GFCI) as recited in claim 14, further comprising:

a sense coil wrapped around the core configured to magnetically couple to the line conductor and the neutral conductor passing through the core opening; and a test coil wrapped around the core and configured to magnetically couple to the sense coil through the core to provide a test signal to the sense coil.

16. The ground fault circuit interrupter (GFCI) as recited in claim 14, further comprising a third magnetic shield having a conduit shape and disposed located in the core opening.

* * * * *